United States Patent

Bando

[11] Patent Number: 5,810,642
[45] Date of Patent: Sep. 22, 1998

[54] MACHINE FOR WORKING A GLASS PLATE

[75] Inventor: Shigeru Bando, Tokushima, Japan

[73] Assignee: Bando Kiko Co., Ltd., Tokushima, Japan

[21] Appl. No.: 337,518

[22] Filed: Nov. 9, 1994

Related U.S. Application Data

[63] Continuation of Ser. No. 986,574, filed as PCT/JP91/00100, Jan. 29, 1991, Pat. No. 5,396,736.

[30] Foreign Application Priority Data

| Jan. 31, 1990 | [JP] | Japan | 2-21453 |
| Jun. 16, 1990 | [JP] | Japan | 2-158394 |
| Jun. 29, 1990 | [JP] | Japan | 2-174187 |
| Jul. 13, 1990 | [JP] | Japan | 2-185965 |

[51] Int. Cl.$^6$ .............. B24B 51/00; B24B 9/08
[52] U.S. Cl. ................. 451/5; 451/44; 451/67; 225/96.5
[58] Field of Search ................. 451/44, 43, 5, 451/70, 67; 225/96.5; 125/23.01

[56] References Cited

U.S. PATENT DOCUMENTS

| 3,474,944 | 10/1969 | Chatelain et al. ............... 225/2 |
| 3,917,139 | 11/1975 | Kabanov et al. . | |
| 4,633,408 | 12/1986 | Reinmold et al. . | |
| 4,651,180 | 3/1987 | Kitaya et al. . | |
| 4,685,180 | 8/1987 | Kitaya et al. . | |
| 4,698,088 | 10/1987 | Bando ............................ 225/96.5 |
| 4,744,176 | 5/1988 | Sack et al. ........................ 451/5 |
| 4,875,461 | 10/1989 | Schara et al. . | |
| 5,005,318 | 4/1991 | Shafir . | |
| 5,040,342 | 8/1991 | McGuire et al. ..................... 451/44 |
| 5,079,876 | 1/1992 | Zumstein . | |

FOREIGN PATENT DOCUMENTS

| 0 217 658 | 4/1987 | European Pat. Off. . |
| 2 397 369 | 2/1979 | France . |
| 27 31 230 | 6/1978 | Germany . |
| 54-70315 | 6/1979 | Japan . |
| 62-78123 | 4/1987 | Japan . |
| 1-37337 | 8/1989 | Japan . |
| 2 000 759 | 1/1979 | United Kingdom . |

*Primary Examiner*—Robert A. Rose
*Attorney, Agent, or Firm*—Nixon & Vanderhye

[57] ABSTRACT

A glass plate working machine includes table 20 on which glass plate 22 is placed, breaking unit 3 for forming a cutting line on glass plate 22 placed on table 20, and pressing the glass plate in the vicinity of a portion of the glass plate 22 formed with the cutting line to break that portion off; and moving unit 67 connected to the breaking unit 3 for moving same linearly along a surface of glass plate 22 placed on table 20. Breakage by breaking unit 3 and movement by moving unit 67 are controlled by a numerical control unit.

1 Claim, 21 Drawing Sheets

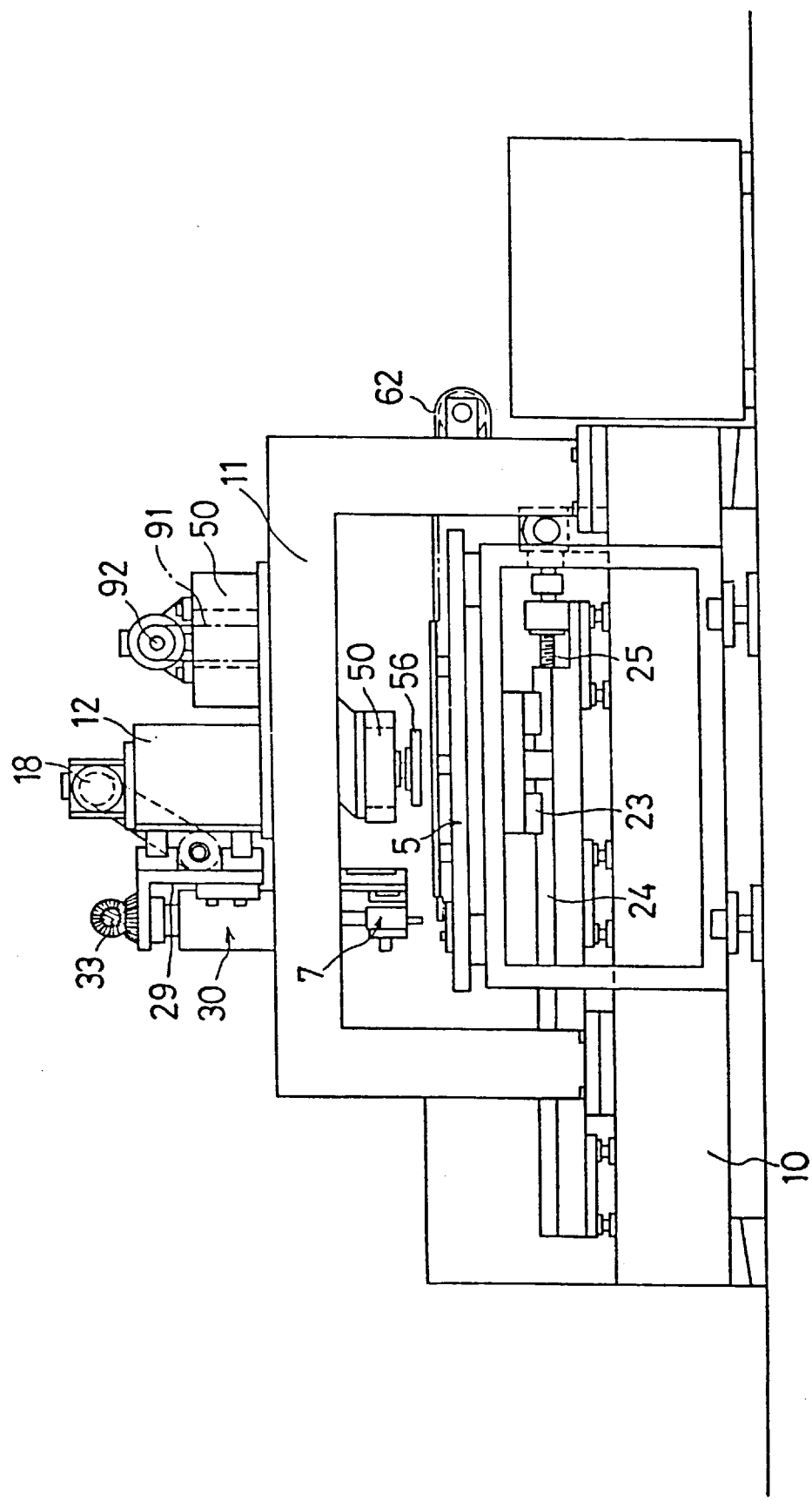

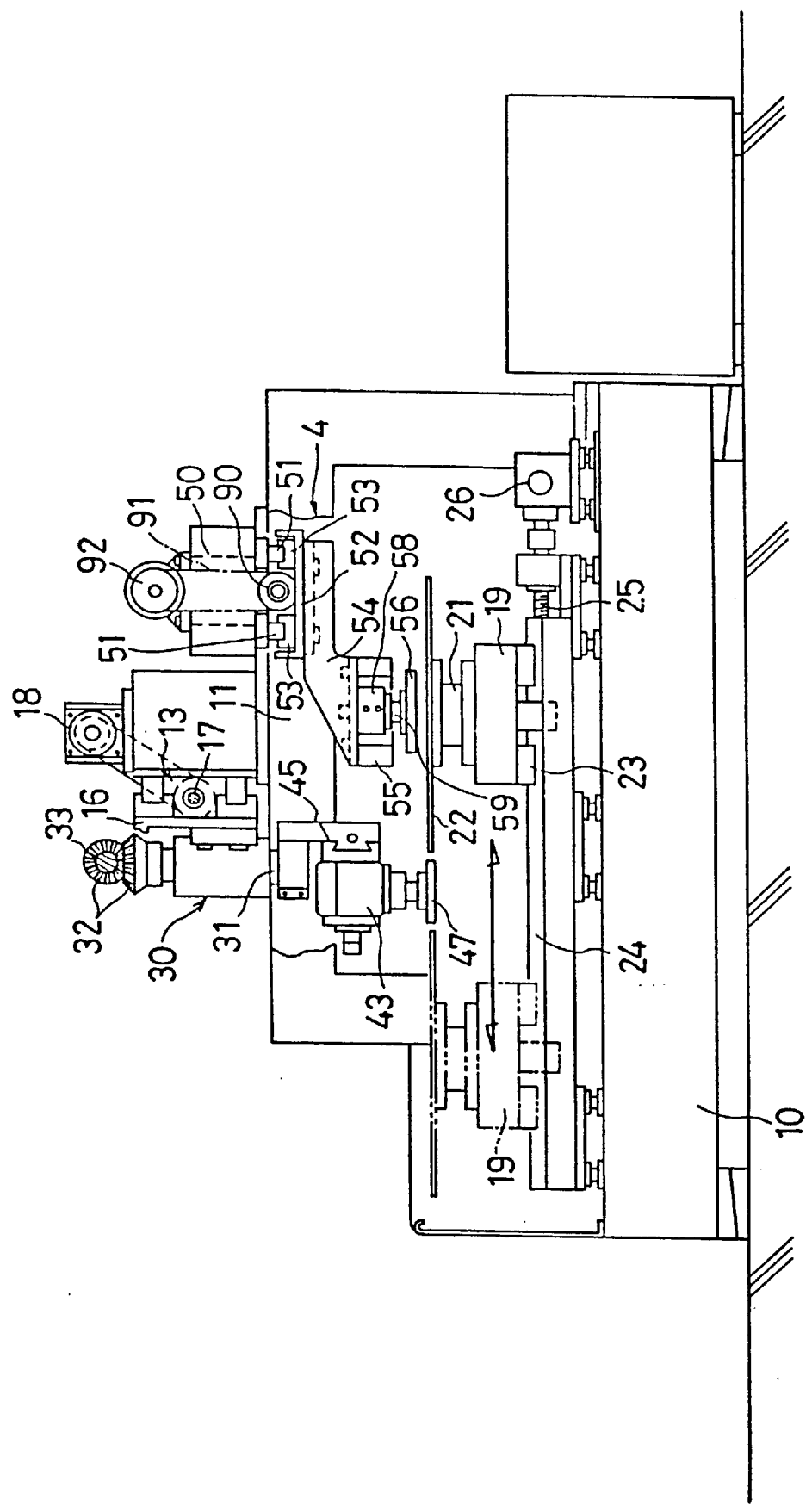

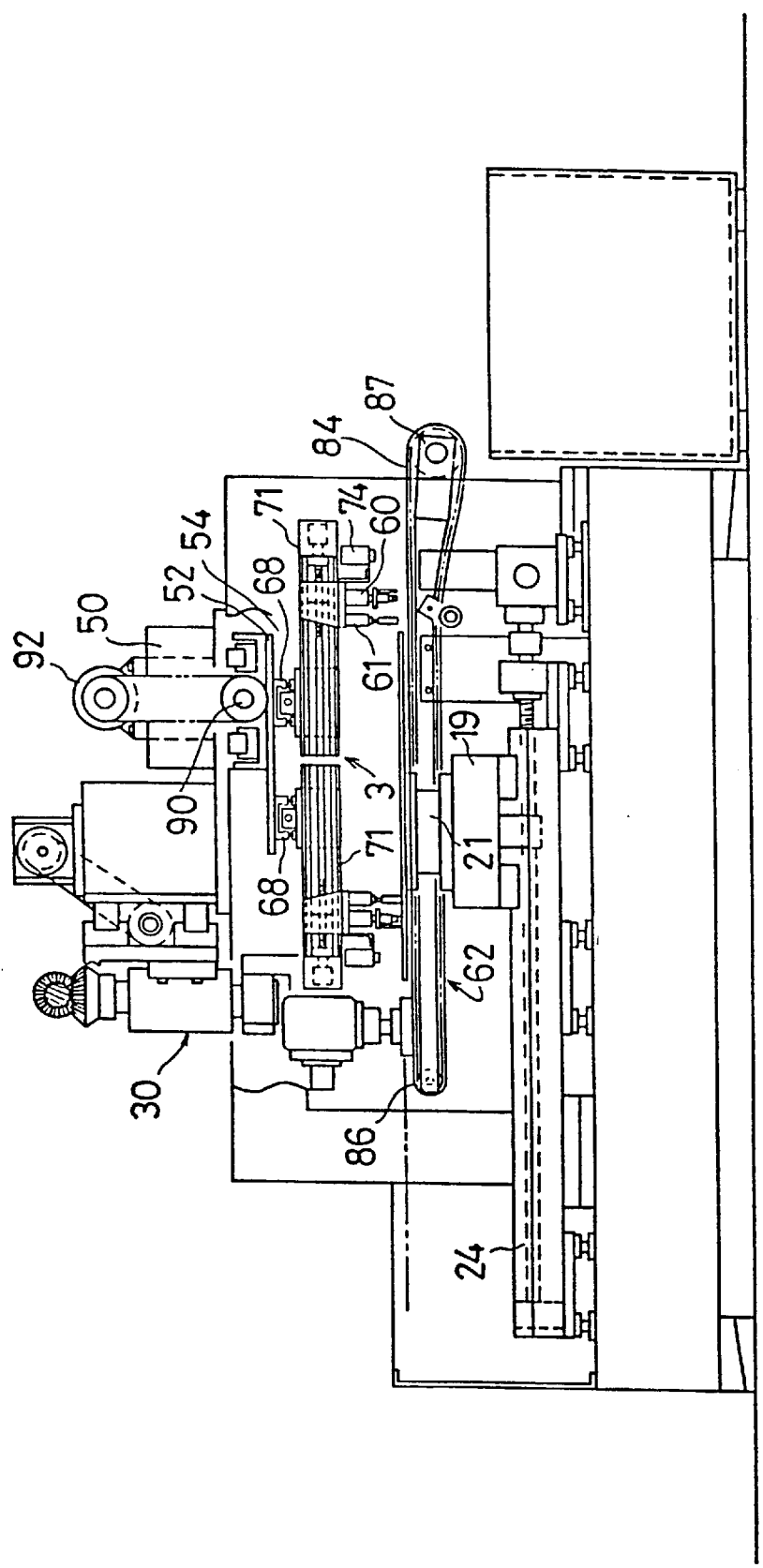

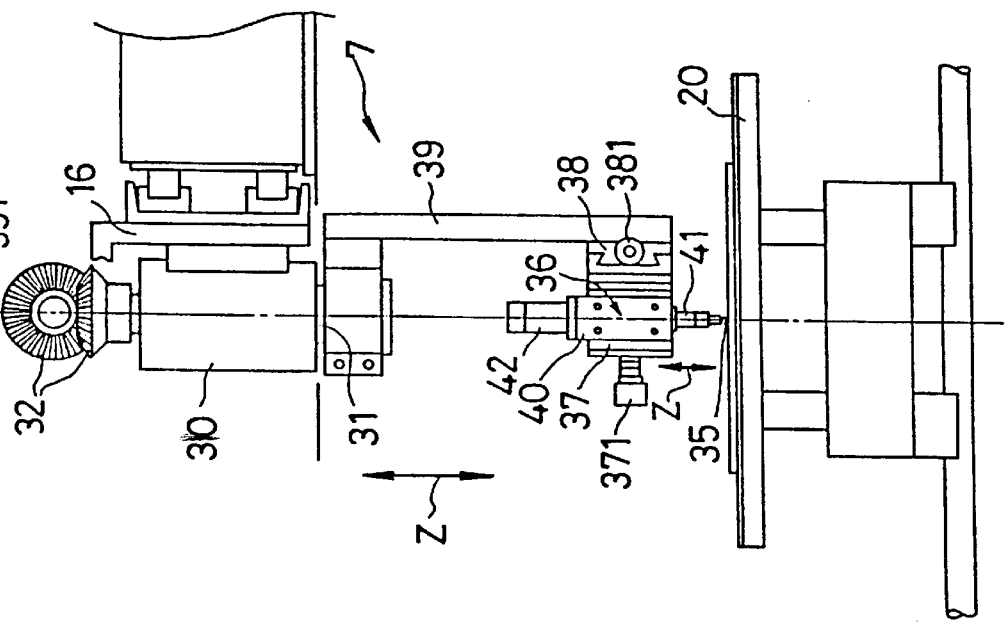
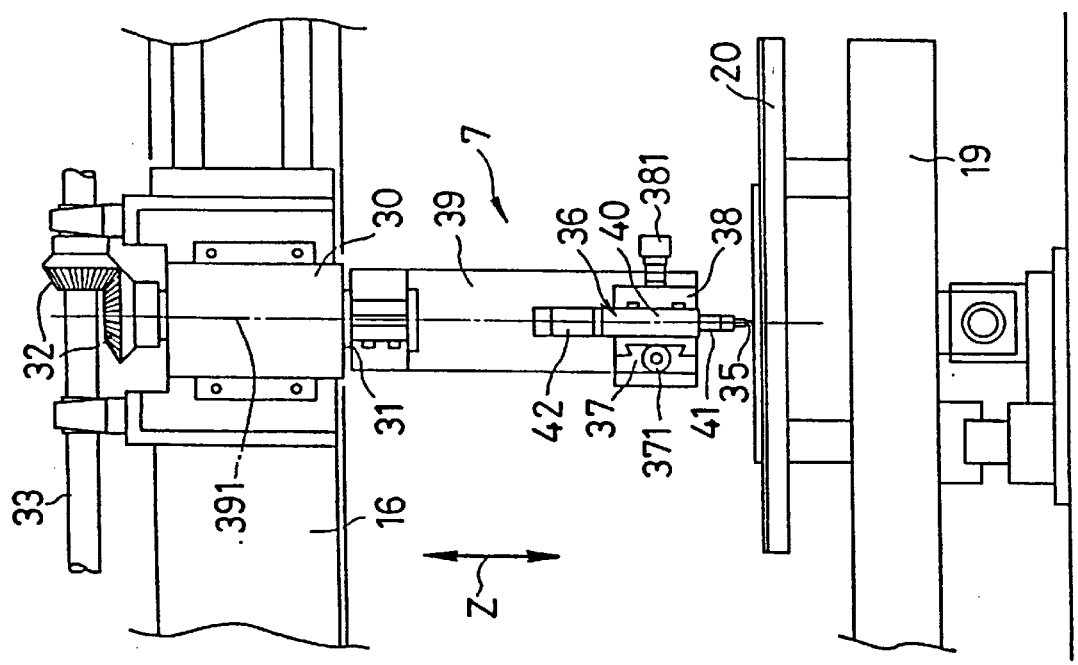

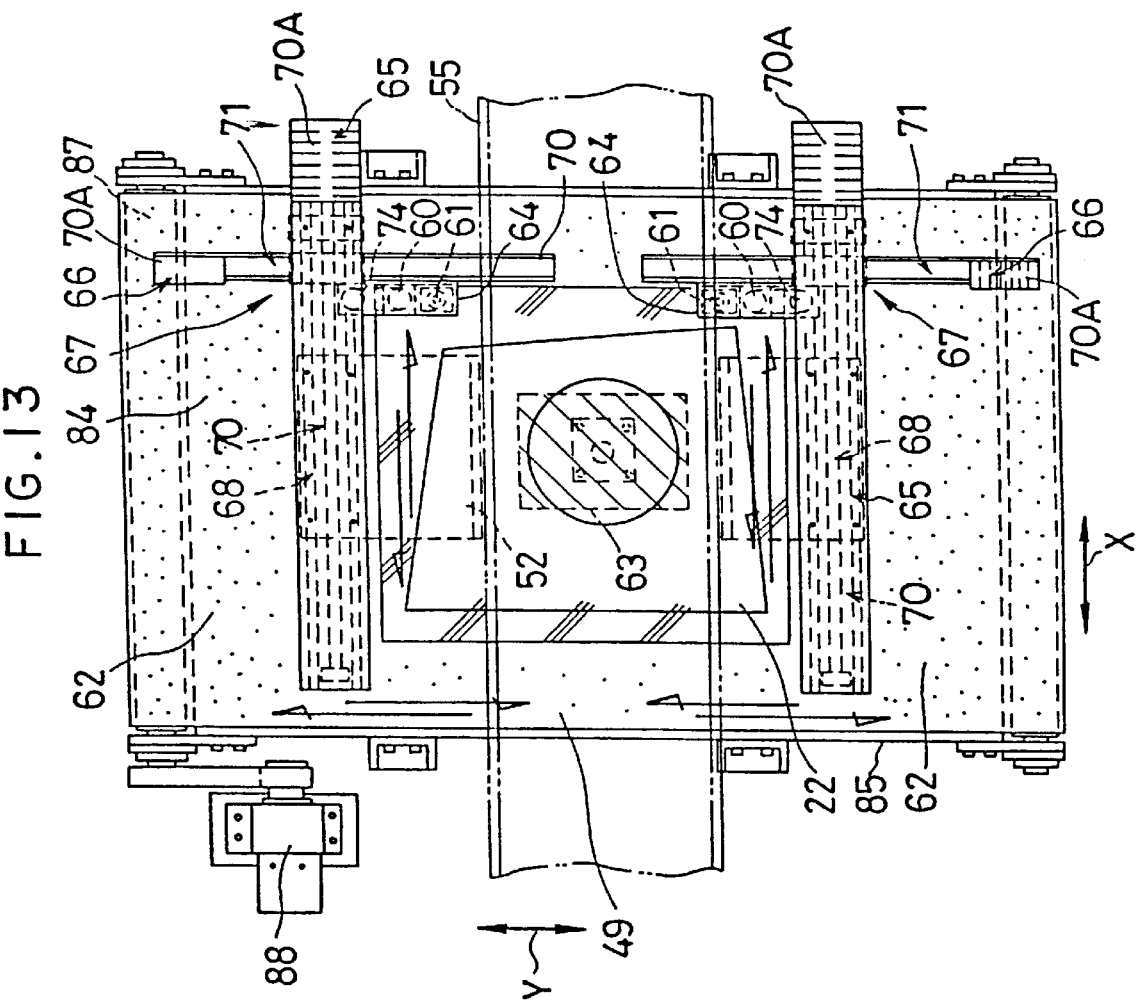

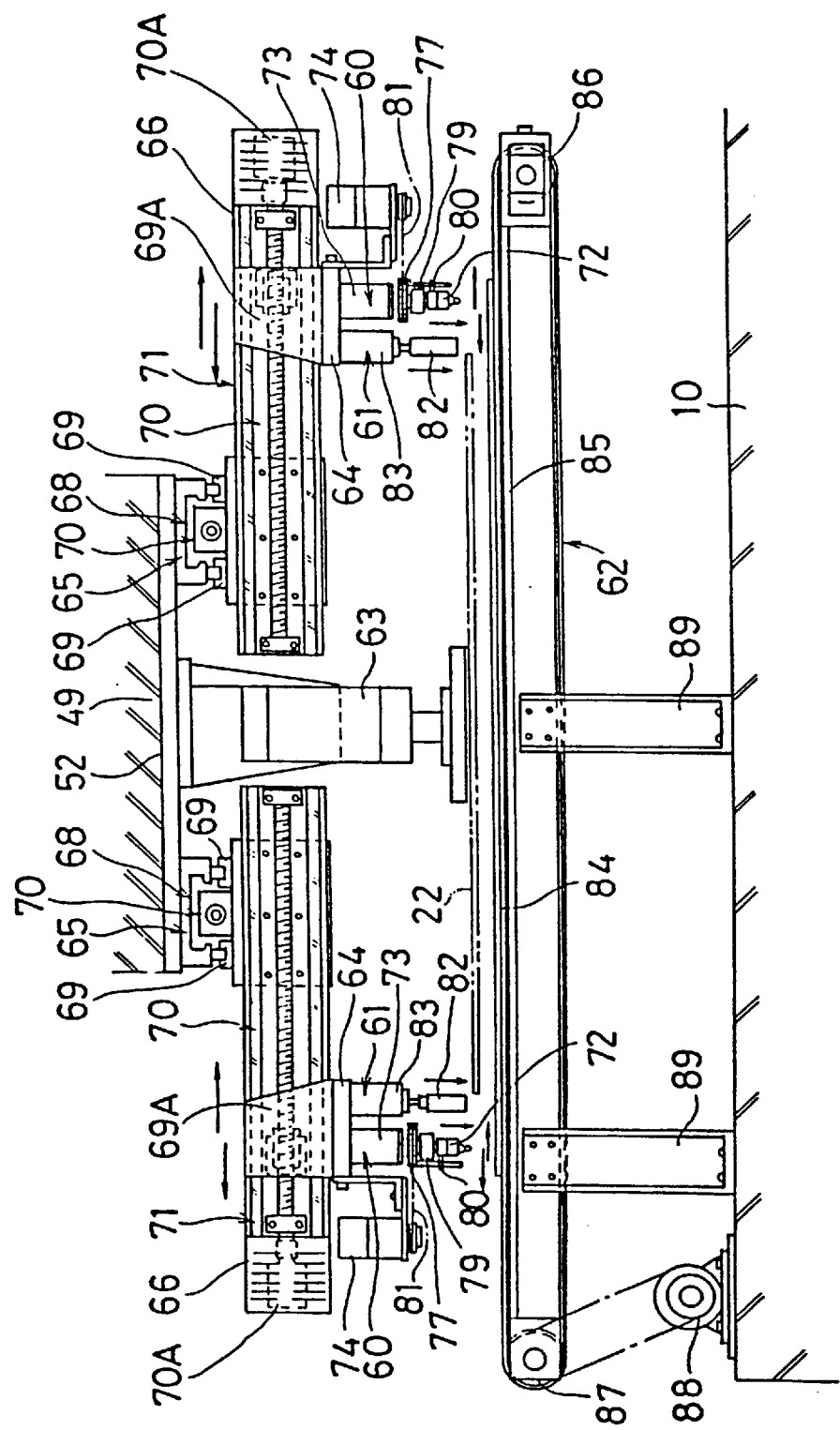

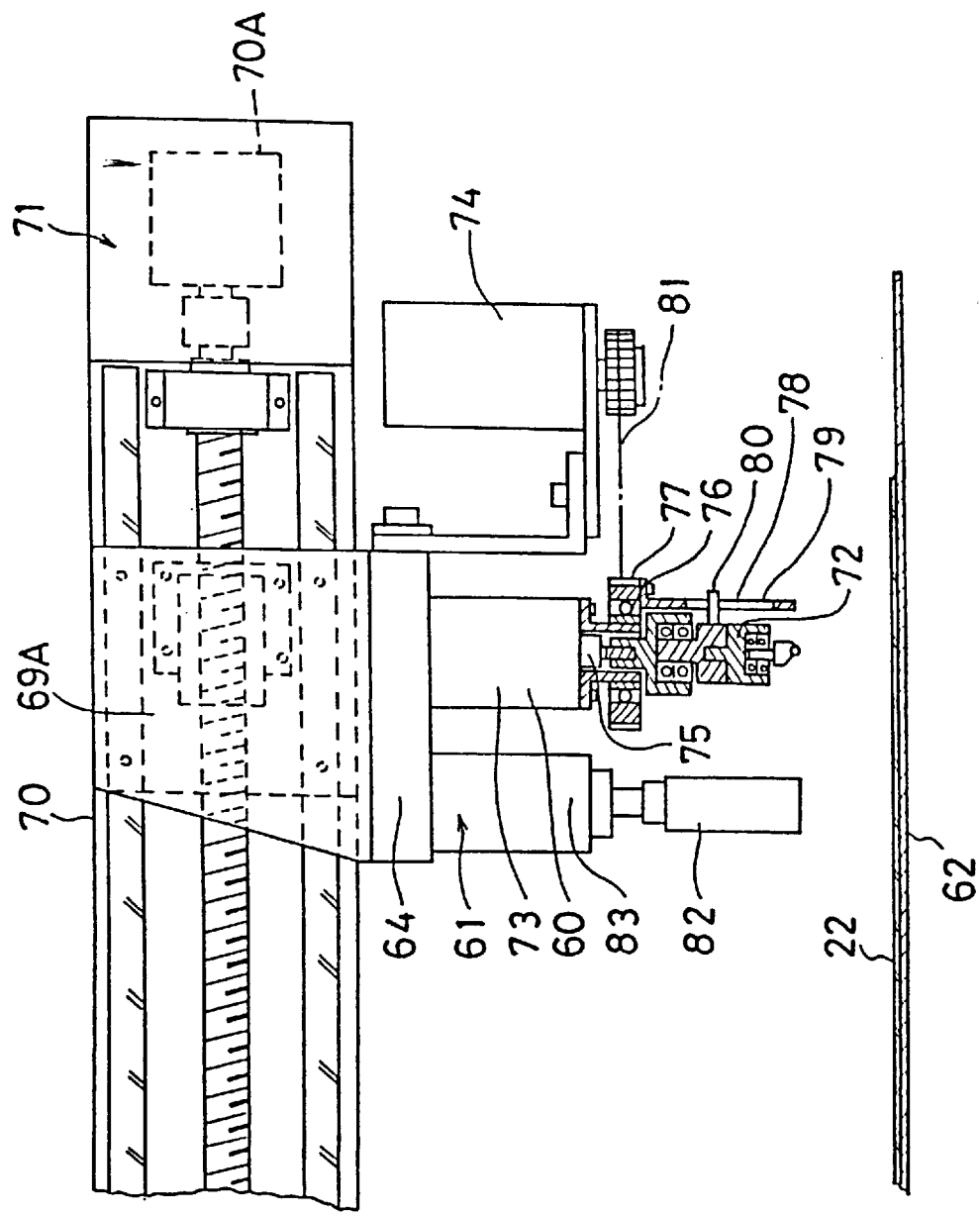

MACHINE FOR WORKING A GLASS PLATE

CROSS REFERENCE TO RELATED APPLICATION

This application is a continuation of 07/986,574, filed as PCT/JP91/00100, Jan. 29, 1991 now U.S. Pat. No. 5,396,736

TECHNICAL FIELD

The present invention relates to a glass breaking device suitable for forming a window glass for an automobile, etc., by breaking an unshaped glass plate, and a glass plate working machine including such a breaking device.

BACKGROUND ART

Conventional breaking devices in glass plate working machines mainly include fire type ones and pressing and breaking type ones.

For example, the fire type device includes a flame blowout unit disposed at a required position outside a glass plate cutting line such that the flame from the flame blowout unit is applied to a glass plate to heat same to thereby break the plate.

The press-breaking type device includes an end cutter and a press unit disposed at required positions. The cutter is first operated to form an end cutting line on the glass plate and then the press unit is operated to break the glass.

As mentioned above, in any of the conventional breaking devices, a flame blowout unit or an end cutter and a press unit are required to be prepared and disposed at required positions. If the shape of the glass plate changes, the layout of the flame blowout units or end cutter and press unit set for obtaining the previous shape of the glass plates must be canceled and a new layout of these devices must be made. These jobs are done almost by workers. If a plurality of the conventional breaking devices is used, they must be disposed in a narrow space while avoiding interference from each other. In addition, effective arrangement of the end cutter and press unit at desired positions is very troublesome, difficult, and time consuming, so that bad breakage, for example, chipping would occur to thereby deteriorate the productivity greatly.

As described above, in the conventional breaking apparatus of the glass plate working machine, the end cutter and press unit are disposed at predetermined positions. Thus, if the shape of a glass plate to be formed or cut varies, the layout of the end cutter and press unit must be changed correspondingly, so that the work is complicated, much work time is required, and this process is not suitable for flexible manufacturing if various forms of glass plates are to be obtained.

The present invention has been made in view of the above problems. It is an object of the present invention to provide a glass plate breaking apparatus which is capable of adjusting immediately to a different shape of a glass plate to be formed newly without requiring any re-layout of the end cutter and press unit which have been once laid out in a fixed manner, simplifying the breaking operation, reducing the work time, and is suitable for flexible manufacturing, and a glass plate working machine including such a breaking device.

DISCLOSURE OF THE INVENTION

According to the present invention, the above object is achieved by a glass plate working machine comprising a table on which a glass plate is placed, breaking mechanism for forming a cutting line on the glass plate placed on the table, pressing the glass plate with the cutting line at a portion of the glass plate near the cutting line to break that portion of the glass plate off, a moving unit connected to the breaking mechanism for moving the breaking mechanism linearly along a surface of the glass plate placed on the table, a turning unit connected to the moving unit for turning the moving unit around a center line normal to the surface of the glass plate, and a controller for controlling breakage operation by the breaking mechanism, movement operation by the moving unit and turning operation by the turning unit.

In the glass plate working machine according to the present invention, the breaking mechanism is connected to the moving unit which is, in turn, connected to the turning unit and the breakage operation of the breaking mechanism, the movement operation of the moving unit and the turning operation of the turning unit are controlled by the controller, so that if a control program corresponding to the shape of a glass plate to be formed is prepared and the controller is operated under the control of this control program, only a change of the control program is required to form a different shape of glass plate.

In the glass plate working machine according to the present invention, wherein since the moving unit is connected to the turning unit so as to be capable of positioning the breaking mechanisms at equally angularly spaced positions in the direction of turning of the moving unit by the turning unit, the breaking mechanisms can equally share the breaking operation on the overall periphery of the glass plate.

The present invention is applicable also to a glass plate working machine which produces an automobile window glass, for example, glass for side windows, front windows, rear windows and rear quarter windows on a flexible manufacturing basis.

Of course, the present invention is applicable to glass plate working machine for grinding and processing the edge of not only an automobile glass but also a table top glass put on a table and other glass plates having a deformed shape, etc..

A glass plate working machine according to the present invention may be arranged such that a glass plate is worked and conveyed in accordance with a numerical control system.

A glass plate working machine according to the present invention may be arranged such that grinding and cutting of glass are performed concurrently under the control of a numerical control device or glass plates are sequentially fed under control over the numerical control device.

A glass plate working machine according to the present invention may be arranged such that only the sole machine performs cutting, breaking and grinding operations on an unshaped glass plate under the control of a numerical control device in a line conveyer system.

The glass plate working machine according to the present invention may be arranged such that a glass plate is ground in the grinding stage while a cutting line is being formed by a cutter on another glass plate in the cutting stage.

One of glass plate working machines according to the present invention includes a cutter for forming a cutting line on an unshaped glass plate in accordance with numerical information, a grind unit for grinding a cut edge of the glass plate, a breaking unit provided between the cutter and the grinding unit for breaking the glass along its cutting line, and a glass conveying unit for sequentially conveying the glass plate to the cutter, breaking unit, grind unit and, when required, a discharge unit.

The glass plate working machine according to the present invention may be arranged such that the cutter and the grinding unit are connected to each other by a common driving mechanism to thereby interlock the respective motions, to perform the cutting and grinding operations in parallel and to simultaneously break a glass plate to be transferred to the grinding unit in the next cycle.

A glass plate breaking apparatus according to the present invention may comprise an angle control unit provided above the center of a glass plate placed on a table so as to have a rotational axis normal to an upper surface of the table, a linear slide unit provided in a movable portion of the angle control unit and having a linearly moving slide member which moves parallel to the upper surface of the table, an end cutter and a press unit juxtaposed on the slide member of the linear slide unit as opposed to the table, a mechanism for controlling the angle control unit and the linear slide unit on the basis of previously stored information to move the end cutter and press unit as a unit in a polar coordinate system to sequentially position the end cutter and press unit such that the end cutter is sequentially activated in an angular movement in one direction to perform an end cutting operation at each of required positions and that the press unit is sequentially activated in a return angular control movement to perform a pressing operation at required positions.

In the breaking unit of the glass plate working machine according to the present invention, an end cutter and a press unit provided as opposed to a glass plate is moved as a unit in a polar coordinate system in combinations of angle turn control and linear movements above the glass plate to sequentially position the end cutter and press unit. The end cutter is sequentially activated in one angle control process direction to cut off the glass plate end when required, and the press unit is sequentially activated on the glass plate to break same off in the return angle control process.

An embodiment of the present invention will now be described in more detail with reference to the drawings and the present invention and other inventions will be clarified.

It is to be noted that the present invention is not limited to those embodiments.

BRIEF DESCRIPTION OF THE DRAWINGS

FIGS. 6–8 are side views and cross-sectional views of the working machine of FIG. 1;

FIGS. 11 and 12 are a front view and a side view, respectively, of a cutting head of the working machine of FIG. 1;

FIG. 13 is an enlarged plan view of the breaking unit of the working machine of FIG. 1;

FIG. 14 is an enlarged front view of the breaking unit of the working machine of FIG. 1;

FIG. 15 is a cross-sectional view of the essential portion of the breaking unit of FIG. 14;

BEST MODE FOR CARRYING OUT THE INVENTION

Figure 1:
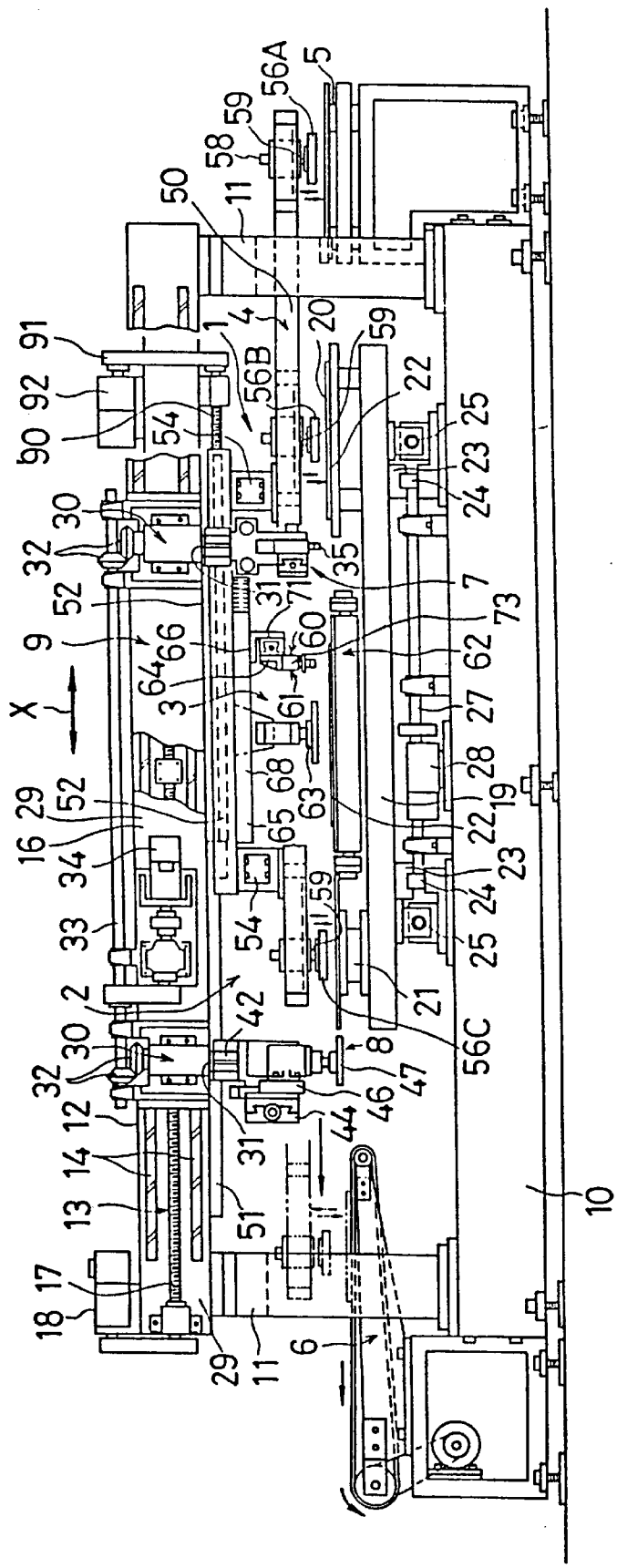
FIG. 1 is a front view of an illustrative embodiment of a glass plate working machine according to the present invention.
Figure 2:
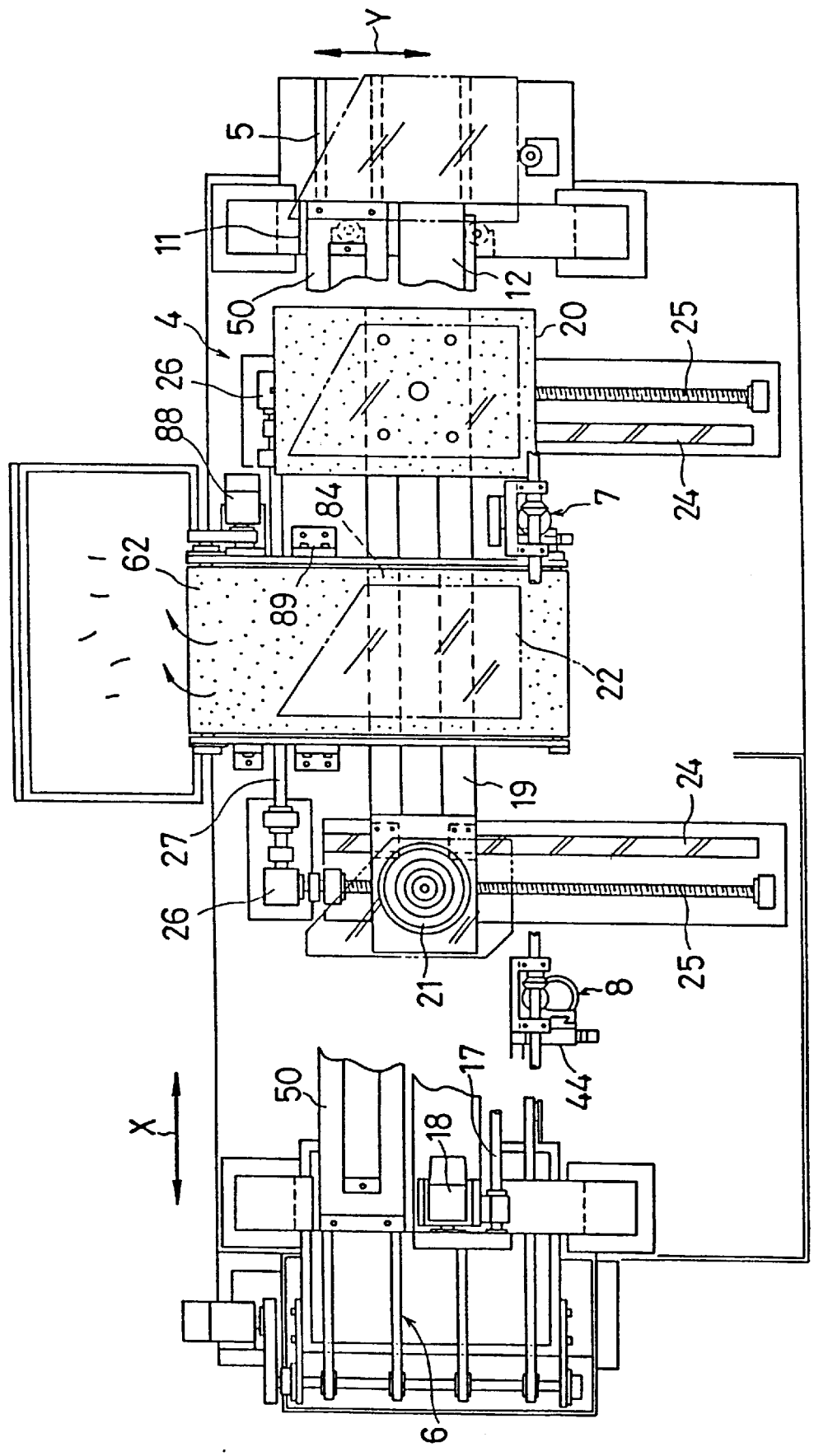
FIGS. 2 and 3 each are a cut-away plan view of the working machine of FIG. 1.

Referring to FIGS. 1–16, a glass plate working machine according to the present invention includes a cutter 1 shown in the right-hand portion of FIG. 1, a grinding unit 2 shown in the left-hand portion of FIG. 1, a breaking unit 3 at the center of FIG. 1 and a glass plate conveying unit 4 behind those elements. Insertion table 5 is disposed to the right of cutter 1 while take-out conveyer 6 is disposed behind grinding unit 2. Cutting head 7 of cutter 1 and polishing or grinding head 8 of grinding unit 2 are connected to a common driving means 9 such that they perform the same parallel motion in the X-Y orthogonal plane coordinate system under control of the numerically controlled interlock means 9. Cutting head 7 and grinding head 8 shares the X and Y axes of the orthogonal coordinate system. In the glass plate working machine, cutting head 7 and grinding head 8 are adapted to move in the X axis direction while work table 19 which holds a glass plate is adapted to move in the Y axis direction as shown in FIG. 2.

Figure 3:
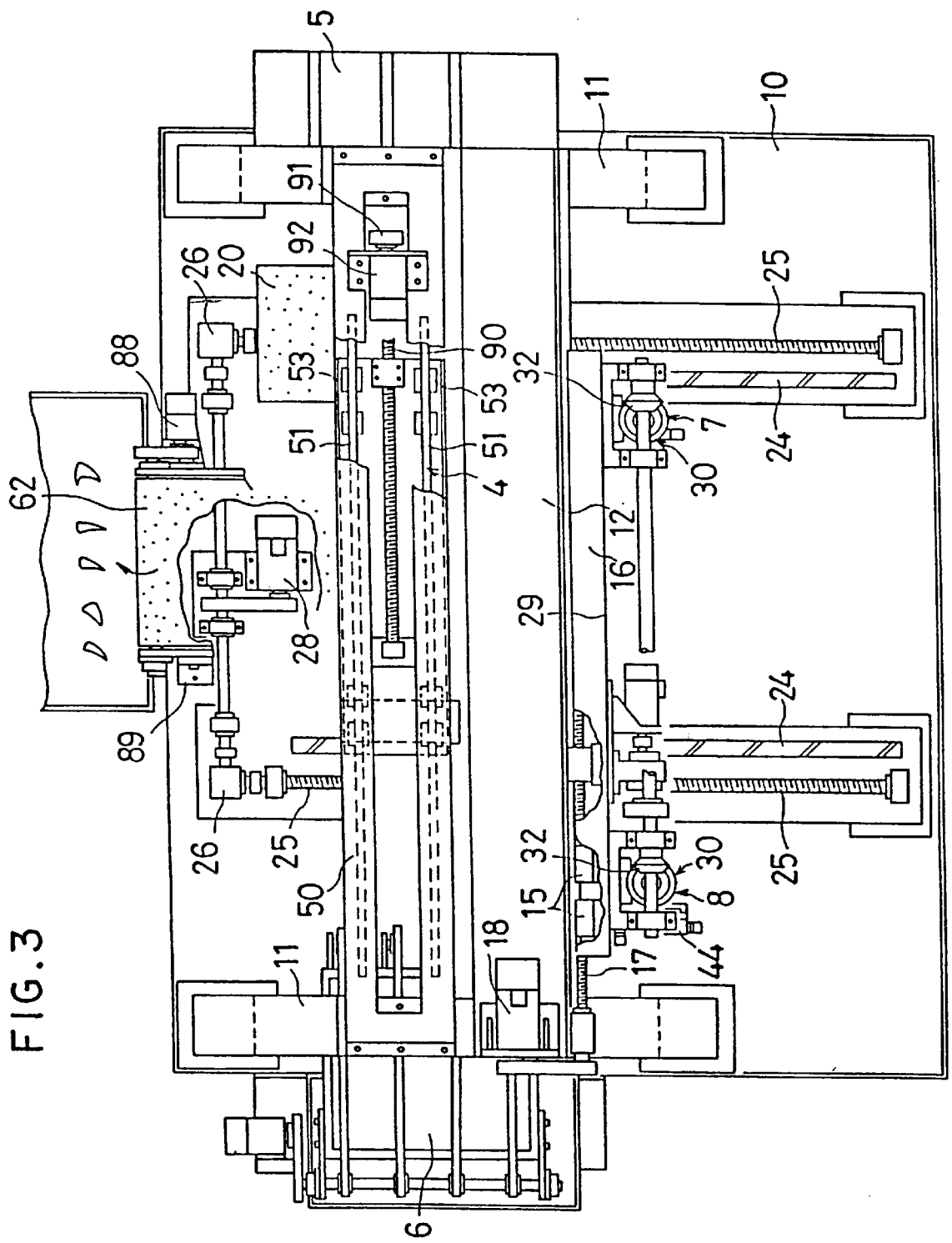

Mount 12 is provided through gate-type the mount 11 upstanding at each end of base 10. Two slide rail units 13 are provided in front of the mount 12 so as to extend in parallel in the X axis direction. Slide rail unit 13 includes parallel rails 14 provided on mount 12 so as to extend parallel to the X direction and a plurality of slides 15 which move on rails 14 as shown in FIG. 3, and to which a linear movement base 16 is fixed. The linear movement base 16 is provided with cutting head 7 and grinding head 8. Therefore, cutting head 7 and grinding head 8 are moved in the X axis direction in conjunction with the movement of linear movement base 16 of slide 13.

The drive of linear movement base 16 in the X axis direction is made by feed screw 17 provided between the pair of slide rails 14 and X axis control motor 18 connected to feed screw 17. Driving means 9 includes rail units 13, linear movement base 16 and motor 18, as mentioned above.

Work table 19 is provided below cutting head and grinding 8 so as to be moved in the Y axis direction. Disposed on work table 19 are cutting table 20 corresponding to cutting head 7 and sucker unit 21 corresponding to grinding head 8. Cutting table 20 has an upper flat surface, which is wider than an unshaped glass plate 22 to be cut, and is covered with a sheet on which the glass plate 22 is supported so as not to impair the glass plate 22. Sucker unit 21 is connected through a piping valve to a vacuum pump (not shown) so as to vacuum suck the glass plate.

Work table 19 has slides 23 parallel to each other in the Y axis direction at each end thereof and each engaging a corresponding slide rail 24. By such engagement, table 19 is supported slidably in the Y direction on slide rails 24. Since slide rails 24 extend in the Y axis direction on the base 10, table 19 is guided movably in the Y axis direction by rails 24.

As shown in FIGS. 2 and 3, the drive of table 19 in the Y axis direction is made by a pair of feed screws 25 provided along slide rails 24, a pair of gear boxes 26 connected to feed screws 25, line shaft 27 connected with gear boxes 26, and a Y axis control motor 28 which rotates line shaft 27 through a belt transmission means.

Disposed on the front 29 of linear movement base 16 movable in the X axis direction, is a pair of bearing units 30 each corresponding to each of sucker unit 21 and cutting table 20 on work table 19. Each bearing unit 30 has shaft 31 supported by bearings. Shafts 31 are disposed along an vertical axis normal to the X-Y plane coordinate system. Cutting head 7 and grinding head 8 are attached to those corresponding shafts 31.

By rotation of shafts 31, cutting head 7 and grinding head 8 are rotated around the corresponding vertical axis normal to the X-Y coordinate axes. Rotation of cutting head 7 and grinding head 8 is made by bevel gears 32 attached to shafts 31 of bearing units 30, line shaft 33 which is provided with the bevel gears 32 at the ends thereof, and Z axis control motor 34 which drives line shaft 33.

As shown in FIGS. 11 and 12, cutting head 7 includes cutter body 36 with cutter wheel 35, setting slide 37 and cross slide 38 which adjust the set position of cutter body 36 in the two directions orthogonal to each other in a horizontal plane, and frame 39 to which setting slide 37 is attached. Frame 39 is attached at an upper portion to shaft 31 of bearing unit 30.

The position of setting slide 37 is adjusted in a predetermined direction by screw 371. The position of cross slide 38 is adjusted by screw 381 in another direction intersecting with the former predetermined direction.

Cutter body 36 includes body 40 attached to setting slide 37, piston rod 41 held movably vertically, for example, through a slide bearing, and air cylinder 42 which vertically moves piston rod 41 attached to body 40, a cutter wheel 35 being attached to an end of piston rod which moves vertically in the Z direction. When a glass plate is to be cut, piston rod 41 lowers to apply a cutting pressure to cutter wheel 35 and hence to the glass plate on cutter wheel 35.

The position of cutter wheel 35 can be adjusted to the position of the rotational axis of cutting head 7 or the position of the axis 391 of shaft 31 of bearing unit 30 by rotating adjusting screws 371 and 381 of setting slide 37 and cross slide 38. The position of cutter wheel 35 can deviate from the position of axis 391, so that fine adjustment of the locus of cutting on glass plate 22 by wheel 35 is made. Thus, the locus of cutting is either enlarged or reduced. Of course, cutter wheel 35 is angularly controlled under the control of rotation of shaft 31 such that its cutting direction or moving direction is always tangential to the cutting line.

Figure 10:
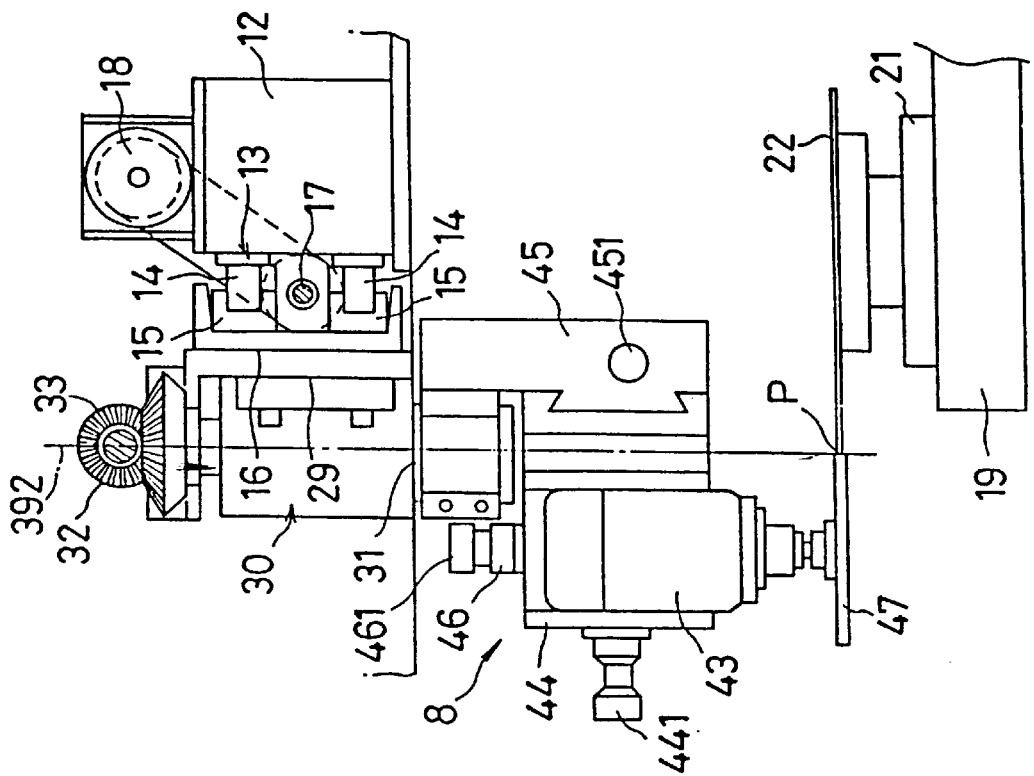
FIGS. 9 and 10 are a front view and a side view, respectively, of a grinding head of the working machine of FIG. 1.
Figure 9:
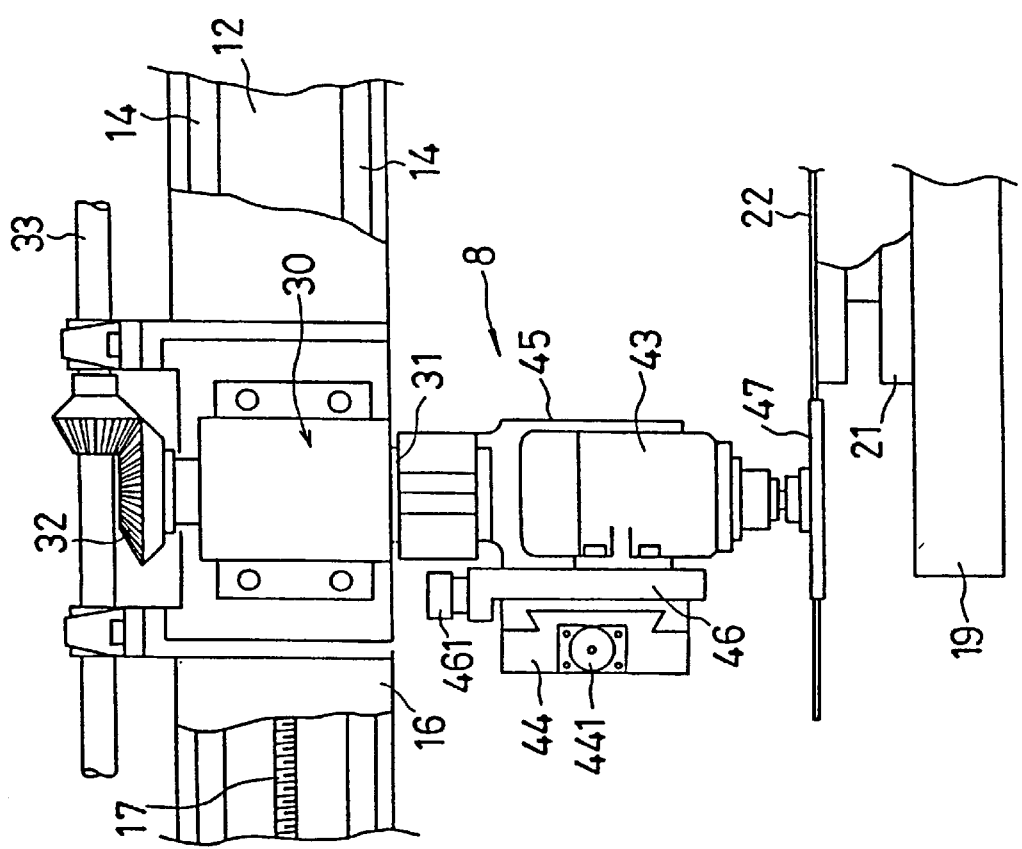

As shown in FIGS. 9 and 10, grinding head 8 includes spindle motor 43, cutting adjustment slide 44 and cross slide 45 for adjusting the position of the spindle motor 43 in two orthogonal horizontal directions, and slide 46 for adjusting the vertical position of grinding wheel 47 which is attached to the shaft of spindle motor 43.

Cutting adjustment slide 44 is moved adjustably in a predetermined direction by turning screw 441. Cross slide 45 is adjustably moved in another direction orthogonal to the former direction by turning screw 451. Vertical slide 46 is adjustably moved in a direction orthogonal to both the aforementioned directions by turning screw 461. Shaft 31 of bearing unit 30 is attached to an upper portion of cross slide 45 and the entire grinding head 8 is suspended by shaft 31.

Grinding head 8 is attached such that the peripheral grinding or polishing surface of grinding wheel 47 coincides with the axis 392 of shaft 31 by adjusting cutting adjustment slide 44 and cross slide 45 or by turning screws 441 and 451.

As just described above, when a grinding or polishing point P on the periphery of grinding wheel 47 coincides with axis 392 of shaft 31, a grinding point P on the periphery of grinding wheel 47 draws a locus of movement coinciding substantially with cutter wheel 35 of cutting head 7.

In grinding head 8, cutting adjustment slide 44 is moved by screw 441 such that grinding point P on the periphery of grinding wheel 47 is ahead of the axis of shaft 31, and that the locus of movement of the point P is slightly reduced compared to that of cutter wheel 35 to give a quantity of cutting to thereby adjust the ground finished size.

Of course, grinding wheel 47 also is angularly controlled by control over the rotation of shaft 31 such that the line connecting the grinding point P on the periphery of grinding wheel 47 with the rotational center of grinding wheel 47 is maintained at all times at a constant angle to the edge line of the glass plate.

Glass plate conveyer unit 4 is provided above work table 19 along cutting table 20 and grinding sucker 21. Glass plate conveyer unit 4 has a pair of feed shaft mount 50 on the side frame bases 11 of base mount 10 and extending parallel to mount 12 and movable in the X axis direction. A movable base 52 is provided through slide 53 on parallel guide rails 51 provided on the underside of feed shaft mount 50 so as to be moved or guided parallel to the X axis direction. The movement of movable base 52 of glass plate conveyer unit 4 is made by feed screw 90 provided between the pair of guide rails 51, and feed shaft drive motor 92 connected through transmission means 91 such as a toothed belt to feed screw 90. Feed shaft drive motor 92 is controlled on the basis of numerical information from the numerical control unit. Therefore, as will be described later, the conveyance or transfer of a glass plate by glass plate conveyer unit 4 is accurately made by numerical control.

Figure 4:
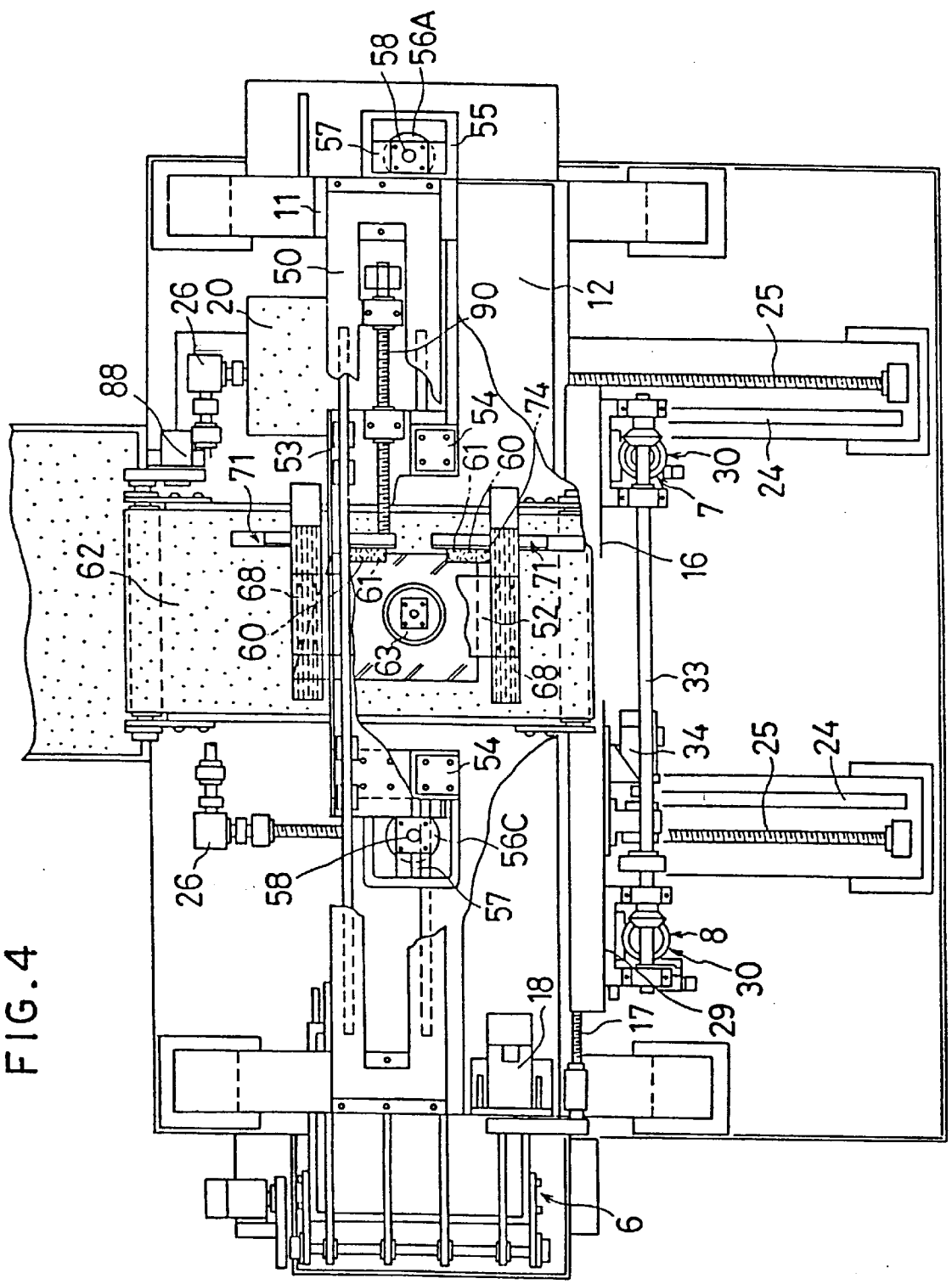
FIG. 4 is a plan view of a glass plate conveyer of the working machine of FIG. 1.
Figure 5:
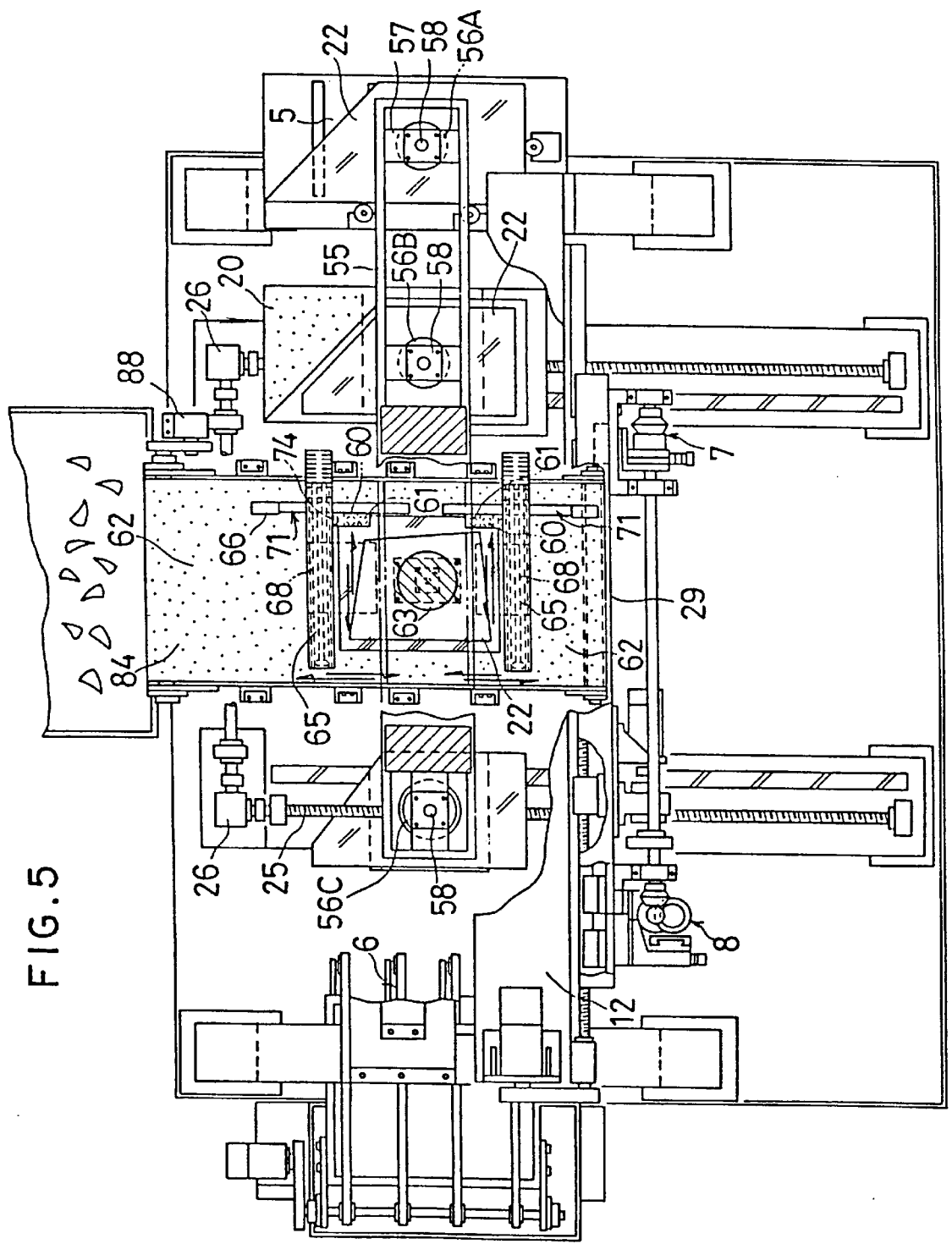
FIG. 5 is a plan view of a breaking unit of the working machine of FIG. 1.

Movable base 52 is provided with a movable frame 55 through brackets 54 at the underside thereof. Movable frame 55 is provided so as to extend through cutting unit 1 and grinding unit 2 and has sucker pads 56 (56A, 56B and 56C) at the respective positions of the each working stage, namely, corresponding to those of heads 7 and 8. Namely, sucker pads 56 are located above insertion table 5, cutting table 20 and grinding suckers 21. As shown in FIGS. 4 and 5, sucker pads 56 are attached to corresponding air cylinders 58 attached to movable frame 55 or movable base 52 through brackets 57.

Sucker pads 56 are attached to piston rods 59 of air cylinders 58, which are arranged such that by extension of piston rods 59, sucker pads 56 are caused to suck an appropriate glass plate 22 so as to lift glass plate 22 when piston rods 59 is moved upwards.

Glass plate conveyer unit 49 moves movable frame 55 in the X direction to move the glass plate 22 to next working stage under the state in which glass plate 22 is lifted. After this movement, sucker pads 56 are again lowered by air cylinders 58 and then suction force which sucks glass plate 22 is released such that glass plate 20 is transferred to that working stage.

Each air cylinder 58 has a rotation stopping mechanism which stops the rotation of its sucker pad 56 when it is moved vertically.

Breaking unit 3 disposed between cutting unit 1 and grinding unit 2 is arranged to break glass plate 22 along its cutting line. Especially shown in detail in FIGS. 13–16, breaking unit 3 includes end cutter 60 which forms an auxiliary cutting line, which facilitate breakage, outside the cutting line formed by cutter 1, press unit 61 which breaks off that portion of the glass plate outside the cutting line, breaking conveyer 62 on which the glass plate 22 to be broken is put and by which the broken glass cullet is conveyed away, vertically movable sucker 63 for pressing the glass plate 22 against breaking conveyer 62 during the time when end cutter 60 and press 61 are operating, lifting the glass plate 22 after breakage and feeding the glass plate to the next grinding unit 2.

The glass plate working machine of the present embodiment is arranged such that the positions of end cutter 60 and press unit 61 are controlled in the orthogonal X-Y plane coordinate system by a previously stored numerical control program so as to be stopped sequentially at required positions for auxiliary cutting or pressing.

End cutter 60 and press unit 61 are provided through a common bracket 64 on a slide assembly 67 of an X axis direction guide and drive means 65 and a Y axis direction guide and drive means 66 arranged in orthogonal relationship. As shown in FIG. 13, the X axis direction guide and drive means 65 includes X axis linear slide 68 provided on the underside of movable base 52 of glass plate conveyer unit 4 so as to be parallel to the direction in which glass plate conveyer unit 4 moves while the Y axis direction guide and drive means 66 includes Y axis linear slide 71 attached through a bracket to slide 69 of X axis linear slide 68 so as to be orthogonal to slide 69.

X and Y axis linear slides 68 and 71 each mainly include a guided drive 70 and servo motor 70A. Slides 69 and 69A are fed stepwise by a servo motor, for example under control of a controller. Of course, slides 68 and 71 are connected to the controller which has the functions of writing into and reading from a memory, receiving teaching data, transmitting data and includes a CPU, etc.

Figure 16:
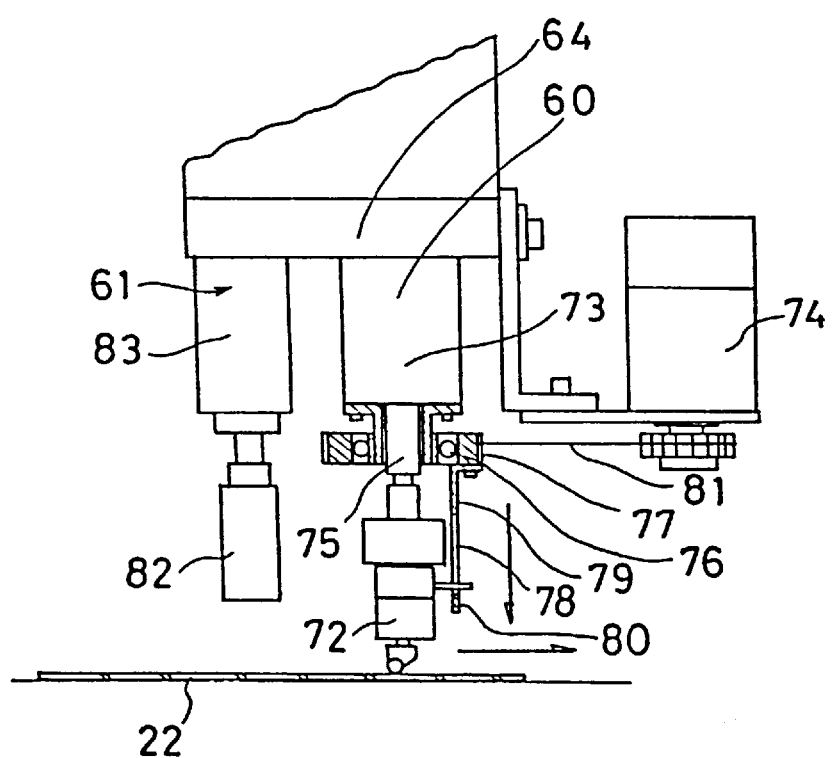
FIG. 16 illustrates the operation of an end cutter of FIG. 14.

As shown in FIGS. 14–16, end cutter 60 mainly includes cutter block 72 to which a cutter wheel is rotatably attached so as to be parallel to the surface of the glass plate, air cylinder 73 which moves cutter block 72 vertically toward and away from glass plate 2 and angle control motor 74 which directs cutter block 72 in an auxiliary cutting direction or in an end cutting direction. Cutter block 72 is attached to piston rod 75 of air cylinder 73.

Timing pulley 77 is attached through bearing 76 concentrically with piston rod 75 to the underside of air cylinder 73 which presses the cutter wheel against glass plate 22. Protrusion 79 with slot 78 extends from the underside of timing pulley 77. By turning protrusion 79 attached to timing pulley 77, protrusion 79 is engaged with engaging member 80 to thereby change the direction of cutter block 72 and hence to case the cutter wheel to align with the auxiliary cutting direction. Of course, timing pulley 77 can be driven through belt 81 by angle control motor 74 attached to the common bracket 64.

Press unit 61 which includes air cylinder 83 and push rod 82 attached to the piston rod of air cylinder 83 is attached to bracket 64 through air cylinder 83. Press unit 61 breaks glass plate 22 along its end cutting line by pushing push rod 82 against that portion of glass plate 22 outside the auxiliary cutting line on glass plate 22 under the actuation of air cylinder 83.

As shown in FIGS. 13 and 14, a pair of cutter 60 and press unit 61 which is in charge of breaking the glass plate is provided on each of the left and right sides of central vertically movable sucker 63 which conveys the glass plate so as to be in charge of the corresponding one of the right and left ranges. A slide assembly 67 which includes an orthogonal assembly structure of a pair of X and Y linear slides 68 and 71 is provided on each of the right and left sides of sucker 63. Each slide assembly 67 includes corresponding end cutter 60 and press unit 61 attached thereto. The slide assemblies 67 are controlled independently of each other in order to reduce a breaking cycle time.

The operation of breaking unit 3 will be described next. When glass plate 22 with a cutting line formed thereon by cutter 1 has returned to above breaking conveyer 62 by sucker pad 56 of cutter 1 and glass conveyer unit 4, vertically movable sucker 63 lowers and pushes glass plate 22 against breaking conveyer 62 so as not to move easily. Under such conditions, the right and left pairs of end cutters 60 and press units 61 are sequentially moved to the required positions by the controller based on data previously inputted, then stopped there, and required angle control is provided over the cutter wheel to form an auxiliary cutter line or end cutting line. Press unit 61 is operated under the sequential position control in the forward way to provide a breaking press.

When the pressing operation has ended and end cutters 60 and press units 61 have returned to their origins, vertically movable sucker 63 is moved upward to lift the remaining glass plate for preparing for delivery to grinding unit 2.

Breaking conveyer 62 of breaking unit 3 extends above work table 19 between cutting table 20 and grinding sucker 21. Breaking conveyer 62 is disposed such that its upper surface is substantially flush with the respective adjacent upper surfaces of cutting table 20 and grinding sucker 21. Breaking conveyer 62 includes conveyer belt 84 moving across the upper surface is work table 19, support plate and frame 85 to allow conveyer belt 84 to move in a recirculating manner, and drive motor 88 attached through a bracket to support plate and frame 85 to drive one drum 87. The breaking conveyer is supported by mount base 10 through bracket 89 on each of the ends of support plate and frame 85.

The upper surface of breaking conveyer 62 is sized so as to support the entire surface of the maximum-sized glass plate 22 fed to the present glass plate working machine. The cullet produced by breaking the glass plate is discharged out of the present machine by driving conveyer belt 84 and simultaneously, the machine receives a glass plate to be fed next on its new cleaned belt surface of the conveyer belt 84.

The operation of the glass plate working machine of the present embodiment and the process from the delivery of a glass plate to its finish will be described sequentially.

When the glass plate working machine starts in operation, cutter wheel 35, grinding wheel 47, work table 19 and glass plate conveyer unit 4 stand by at their origins or start positions.

The origin of work table 19 is under sucker pad 56 of glass plate conveyer unit 4.

At the start position of work table 19, the line passing the centers of sucker pads 56 aligning in the direction of progress of glass plate 22 is arranged to coincide with the centerline of worktable 19.

The origin of glass plate conveyer unit 4 is a position where transfer frame 55 is near the glass plate feed or insertion side or when sucker pad 56 and more particularly sucker pad 56A are located above insertion table 5. It is defined when sucker pad 56 is located at a position shown in FIG. 1.

As described above, when each working unit is at the origin, first, an unshaped glass plate 22 is put on insertion table 5 for glass plate 22. A start button (not shown) for the working machine is pressed to start up the machine. Sucker pad 56A then lowers to suck and lift glass plate 22.

Transfer base 52 moves under this situation due to the movement of glass plate conveyer unit 4. When sucker pad 56A arrives at a predetermined position on cutting table 20, sucker pad 56A lowers and releases the suction for glass plate 22 to put it on cutting table 20, again rises and returns. Directly thereafter, transfer base 52 starts to move back to the origin at which time cutting head 7, grinding head 8 and work table 19 start to move under numerical control and to perform a cutting operation, and, in more detail, a cutting line formation by cutter wheel 35.

When cutting head 7, grinding head 8 and table 19 return to their respective origins after the cutting operation has ended, sucker pad 56 again lowers to lift glass plate 22. Thus, by the movement of transfer base 52, the cut glass plate 22 on cutting table 20 is moved onto breaking conveyer 62. A new glass plate 22 is fed to cutting table 20 from insertion table 5.

When a cutting line is being formed on glass plate 22 on cutting table 20, breaking unit 3 forms a cutting line in position on the glass plate with end cutter 60 disposed at the predetermined position. Sucker pad 56 then lowers, sucks glass plate 22, operates press unit 62 disposed at a predetermined position to break off and remove unnecessary glass portions such as glass ends, while lifting sucker pad 56 and the resulting glass plate 22 having a predetermined outer shape.

Thereafter, termination of the cutting operation by cutting unit 1 is awaited.

After the cutting operation has ended, glass plate 22 on breaking unit 3 is transferred to sucker 21 of grinding unit 2 by the operation of glass plate conveyer unit 4. The next glass plate with a cutting line thereon is fed to the breaking unit 3 and a new glass plate 22 is fed to cutting table 20.

The shaped glass plate 22 transferred to grinding unit 2 is ground or polished concurrently with the next cutting operation. At the breaking unit 3, the breaking operation is performed concurrently with the cutting line forming operation and grinding operation.

Of course, the operation of grinding units 3 is performed in conjunction with the operation of cutting unit 1.

Glass plate 22 ground by grinding unit 2 is moved to taking conveyer 6 in the next operation cycle of glass plate conveyer unit 4. Glass plate 22 is taken out of the glass plate working machine by the operation of taking conveyer 6.

As described above, the glass plate working machine of the present embodiment is above to perform cutting and grinding operations concurrently using the common control means, so that the number of operations is greatly reduced compared to the conventional technique which uses separate units.

The glass plate working machine of the present embodiment is able to cut and grind a glass plate on the basis of single numerical data, so that it can easily adjust to a different kind of material to be worked and is suitable for flexible manufacturing.

While cutting unit 1 and grinding unit 2 are working the glass plate, breaking unit 3 automatically breaks another glass plate simultaneously, so that the breaking operation has a time margin to thereby ensure automatic glass breaking.

The glass working machine of the present embodiment includes cutting unit 1, breaking unit 3, grinding unit 2 and glass conveyer unit 4 extending through cutting unit 1, breaking unit 3 and grinding unit 2, so that this sole machine can automatically perform the operations of supplying unshaped glass plate 22 to taking ground glass plate 22 in a continuous manner without requiring manual operations.

The machine of this embodiment is very compact, reduces the space and requires no large-scaled system which controls the respective units in a systematic manner compared to the large-scaled line glass plate working machine which includes separate units which are sequentially connected through a conveyer. The present machine is convenient for changing the kind of products and suitable for flexible manufacturing.

Another specified example of the breaking unit in the glass plate working machine according to the present invention will be described.

Figure 17:
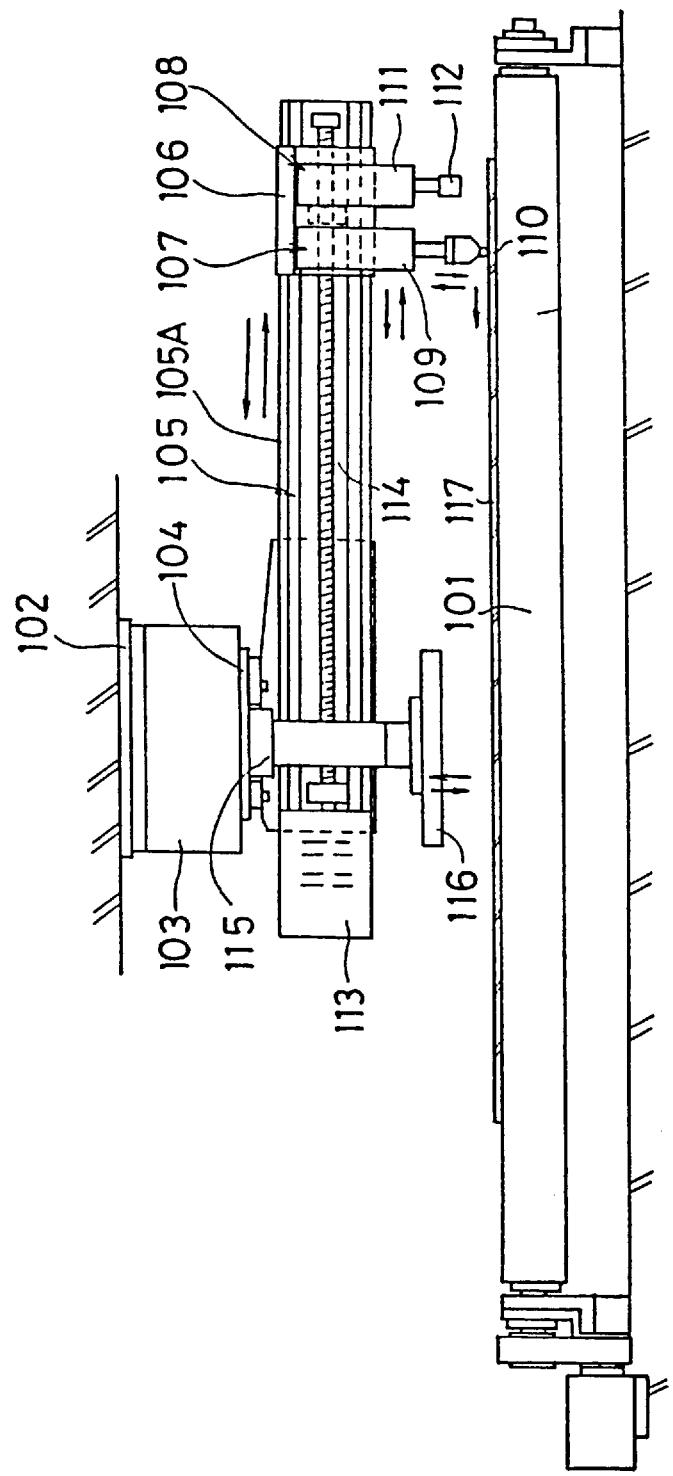
FIG. 17 is a front view of another embodiment of the breaking unit of the glass plate working machine according to the present invention.
Figure 18:
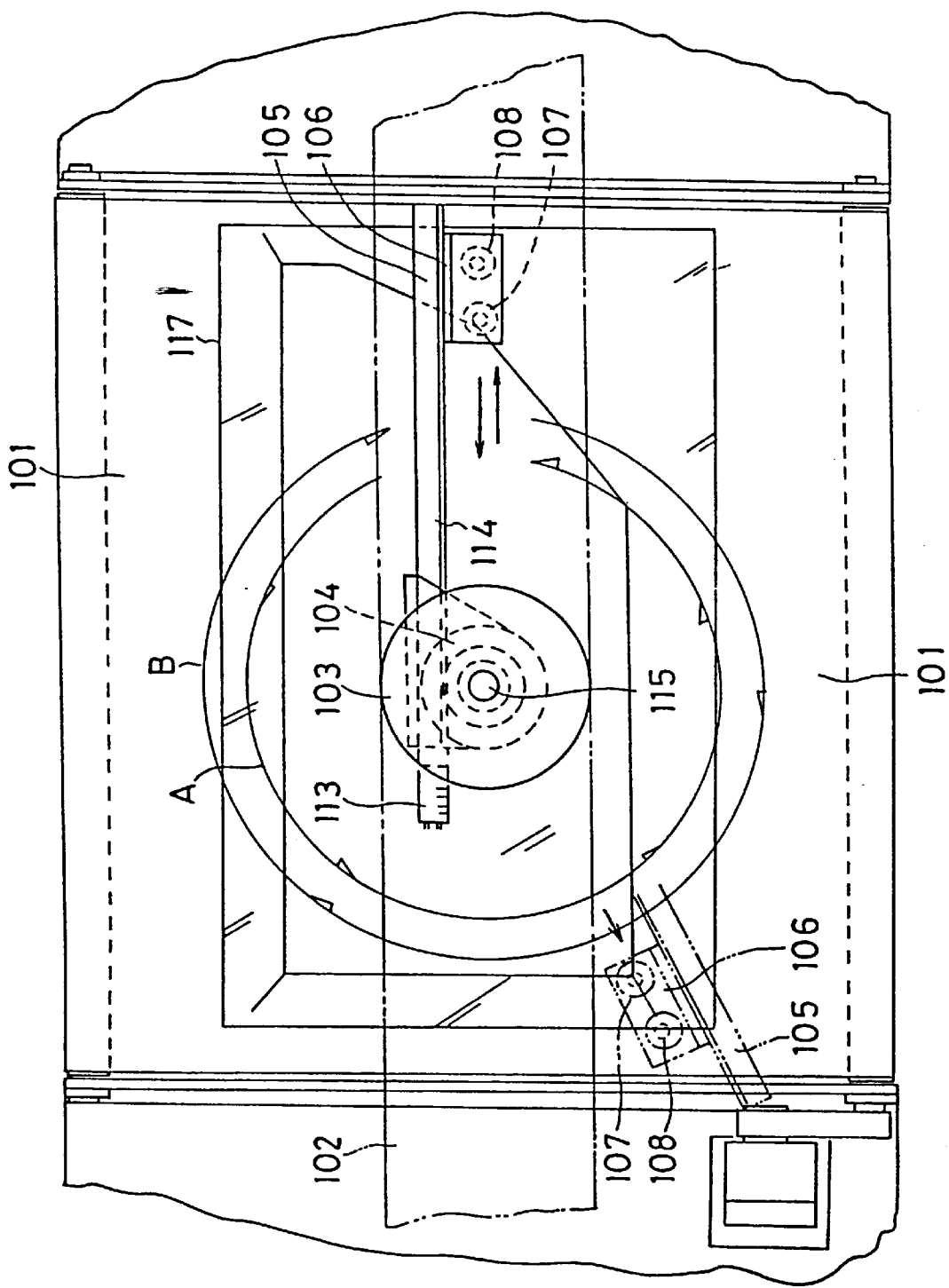
FIG. 18 is a plan view of the illustrative embodiment of FIG. 17.

In FIG. 17, table 101 on which a glass plate is placed usually includes a belt conveyer unit to discharge the cullet produced by breaking the glass plate.

Frame 102 is disposed above table 101, and angle control unit 103 is attached to frame 102 above the center of table 101 or above the center of a glass plate placed on table 101. Angle control unit 103 is attached such that its rotational axis is normal to the upper surface of table 101.

A linear slide unit 105 is attached directly or through an arm or bracket to movable member 104 of angle control unit 103. Linear slide 105 is arranged such that its arm 105A rotates parallel to glass plate 117 above the upper surface of table 101 due to the operation of angle control unit 103 while its slide 106 linearly moves on arm 105A or moves linearly parallel to glass plate 117.

End cutter 107 and press unit 108 are provided in juxtaposed relationship to each other on slide 106 of linear slide unit 105 and are faced to the table 101. End cutter 107 and press unit 108 perform a polar coordinate movement parallel to and over table 101 and hence over glass plate 117 to thereby perform a stepwise positioning movement due to the operation of angle control unit 103 and linear slide unit 105.

In end cutter 107, cutter wheel block 110 is attached to an end of air cylinder 109 which moves toward and away from glass plate 117. In press unit 108, a push rod 112 is attached to an end of air cylinder 117 which moves toward and away from glass plate 117. Angle control unit 103 includes a motor with a rotary position detector, and is connected to a drive runit and the controller for digital servo control, position control, etc. Angle control unit 103 includes a position command inputting unit, an information memory for input speed command, etc., a memory reading unit, etc.

Linear slide unit 105 mainly includes servo motor 113 and a guided drive unit 114 provided on arm 105A. Slide 106 is driven stepwise, etc., and fed under servo control by the controller. Of course, linear slide unit 105 is connected to a controller such as mentioned above. The controller has the functions of writing data into a memory, reading data from the memory, receiving teachings, and transmitting data and includes a CPU, etc..

A fixed hollow body 115 is disposed at the center of rotation of angle control unit 103. Disposed in hollow body 115 is sucker unit 116 which moves toward and away from table 101, from which glass plate 117 obtained by breaking off the outer edge of the glass plate is lifted by sucker unit 116, and separated from its cullet, and the cullet is discharged outside by the belt conveyer structure of the table itself.

According to the present embodiment, the juxtaposed end cutter 107 and press unit 108 are subjected, above glass plate 117, to turning the turning angle of which is controlled around the center of glass plate 117 and control of linear movement by linear slide 105 to be sequentially positioned at the previously stored positions outside a tangent to the glass plate 117. In the positioning, end cutter 107 is operated when linear slide unit 105 is turned in one direction or in the A direction from the origin to perform sequential end cutting operations and then operates press unit 108 due to turning of linear slide unit 105 in the return or B direction to press and break the glass plate each time the positioning is performed.

Another specified example of the breaking unit of the present invention will be described with reference to FIGS. 19–21. In the breaking unit of the present embodiment, that portion of the breaking unit which is the same in structure as that of the breaking unit of FIG. 17 is identified by the same reference numeral and a further description thereof will be omitted.

Figure 19:
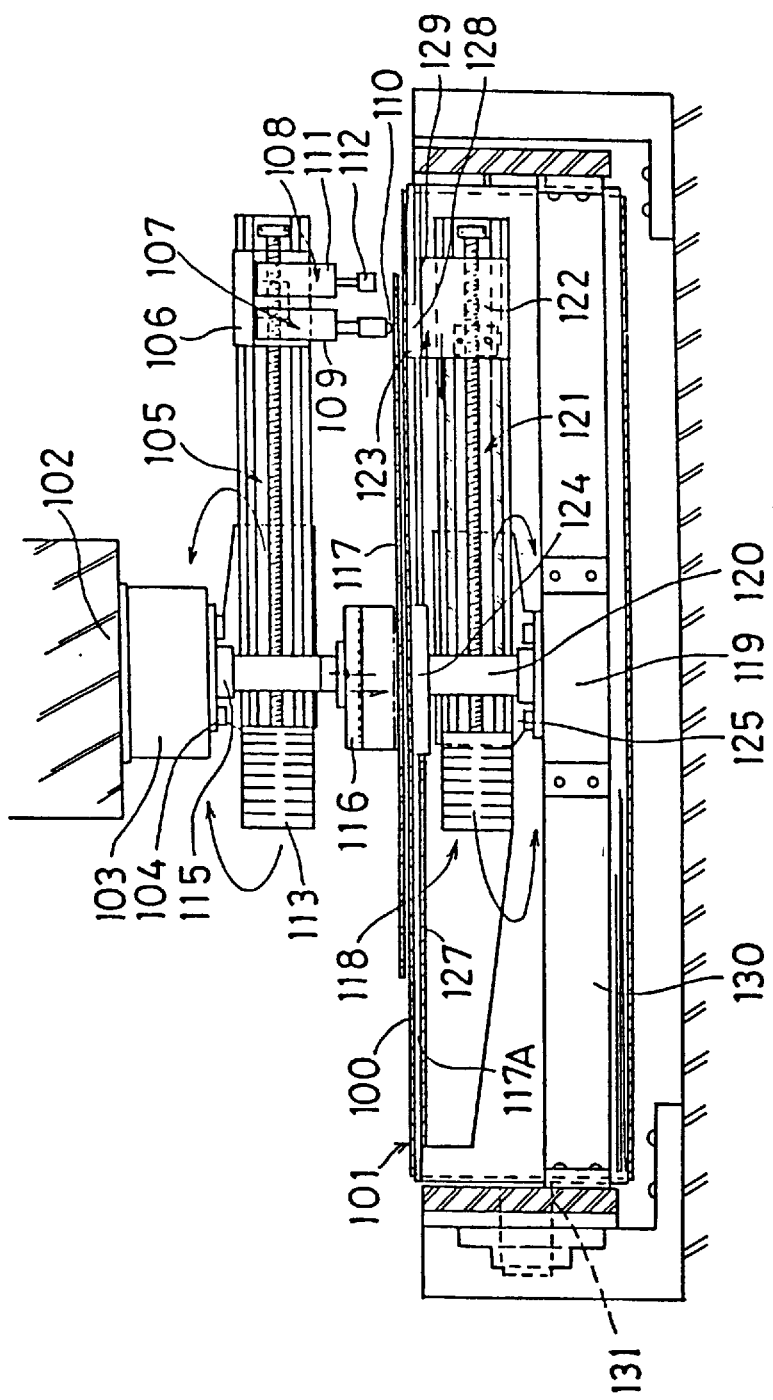
FIG. 19 is a front view of a further illustrative embodiment of the breaking unit of the working machine according to the present invention.
Figure 20:
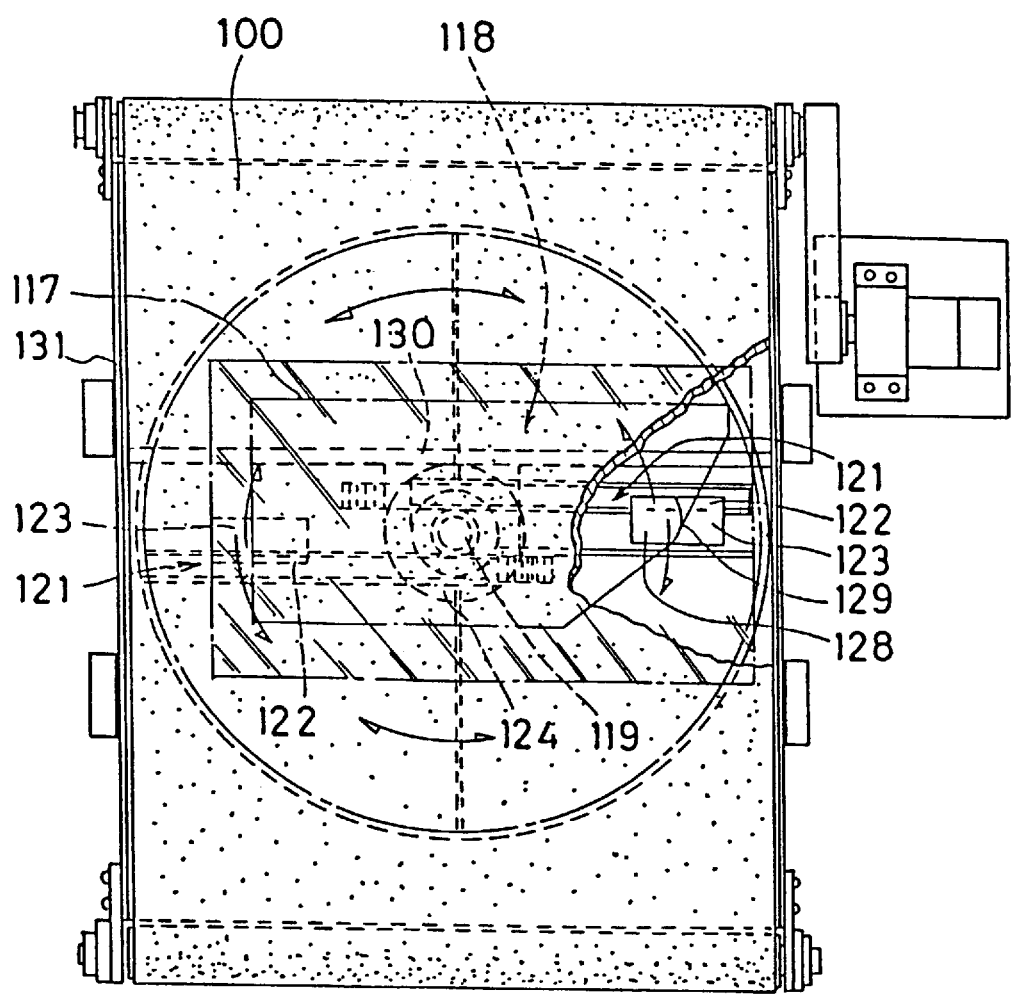
FIG. 20 is a plan view of the embodiment of FIG. 19.
Figure 21:
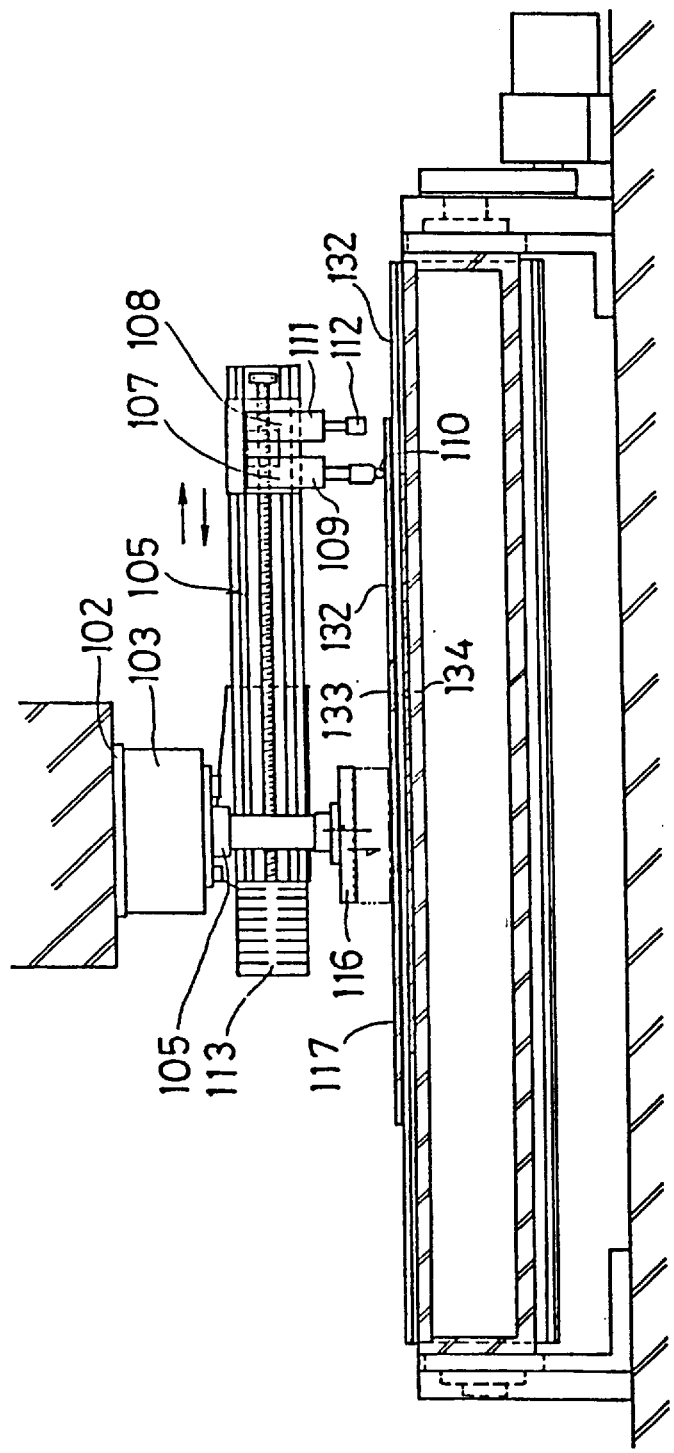
FIG. 21 is a front view of a still further embodiment of the breaking unit of the glass plate working machine according to the present invention.

In FIGS. 19–21, belt conveyer unit 101 includes conveyer belt 100 on which glass plate 117 is placed and support plate 117A which supports conveyer belt 100 on a flat surface thereof. Support plate 117A has a circular hole in the area which supports glass plate 117 in which hole glass plate support unit 118 is disposed.

Glass plate support unit 118 includes at its center an angle control motor 119 which has a rotational member 120 to which linear slide unit 121 is attached so as to extend parallel to an upper surface of conveyer belt 100. The slide 122 of linear slide unit 121 is provided with glass receiver 123 at a position where glass plate 117 is supported through conveyer belt 100.

Support base 124 which supports glass plate 117 and conveyer belt 100 on a flat portion thereof is provided upstanding from a central fixed portion of angle control motor 119. An upper surface of support base 124 is set so as to be flush with support plate 117A which supports conveyer belt 100.

Angle control motor 119 is disposed such that its rotational center axis is normal to support base 124 or support plate 117A.

Therefore, linear slide unit 121 attached directly or through bracket 125 to rotational member 120 extends parallel to an upper surface of support base 124 or an upper surface of conveyer belt 100 so as to make a controlled horizontal turn around support base 124.

Belt support plate 127 which supports conveyer belt 100 is held by linear slide unit 121 so as to rotate together with linear slide unit 121. Angle control motor 119 has the same function as angle control unit 103 of the breaking unit and is controlled and driven by the controller in a manner similar to that mentioned above.

Linear slide unit 121 also has the same function as linear slide unit 105 and is similarly controlled by the controller.

Angle control motor 119 is held by conveyer frame 131 through bracket 130.

Glass receiver 123 attached to slide 122 of linear slide unit 121 performs a polar coordinate system movement due to its numerically controlled linear motion and angular control of angle control motor 119 to sequentially support required portions of glass plate 117.

When glass plate 117 is disposed on belt conveyer unit 101 and fixedly held between support base 124 of glass plate support unit 118 and sucker unit 116 of the breaking unit, and end cutter 107 and press unit 108 of the breaking unit are subjected to angularly controlled revolution by angle control unit 103 around the center of glass plate 117 above glass plate 117 and linear movement controlled by linear slide unit 105 to be sequentially positioned at the previously store positions to thereby perform an end cutting or pressing operation, glass receiver 123 of support unit 118 makes a polar coordinate system movement on the basis of a previously stored program to support glass plate 117 from below at a position where the end cutting or pressing is being made. Namely, glass receiver 123 moves following end cutter 107 and press unit 108 on the basis of the previously stored program.

Normally as shown in FIG. 19, glass receiver 123 includes a flat portion 128 and a step portion 129. When end cutter 107 is activated the flat portion 128 is involved in this operation while when press unit 108 is activated, step 129 is aligned with a tangential to glass plate 117.

As mentioned above, according to the specified embodiment shown in FIG. 19, glass plate 117 is supported at its center through conveyer belt 100 by support base 124, pressed by sucker unit 116 and supported by glass receiver 123 which moves in a polar coordinate system below conveyer belt 100 each time end cutting and pressing is made for breaking purposes. Therefore, glass plate 117 does not escape and bend and can freely be pressed and broken.

Glass receiver 123 can freely change its position below conveyer belt 100 which supports glass plate 177. As a result, glass plate 117 can bring glass receiver 123 to any position on a tangent to glass plate 117.

Therefore, according to the present breaking unit, glass receiver 123 can be sequentially moved to a plurality of required positions on glass plate 117 where end cutting or pressing is made by end cutter 107 and press unit 108 positioned above glass plate 117 to thereby support glass plate 117. According to the breaking unit, glass plate 117 is supported on a flat surface to be subjected to end cutting and further is supported at a step to be broken by pressing.

The breaking unit of this particular embodiment requires no templates for breakage. Those positions can be set sequentially, for example, by computer. Overall automation is possible as circumstances require. Thus, a glass plate working machine which is able to carry out the working for the glass plate without any attendant may be constituted.

In the present invention, the breaking unit is not necessarily required to be a breaking unit which requires no templates. One specified example of the breaking unit using a template is shown in FIG. 21.

A breaking unit such as is shown in FIG. 21 includes conveyer belt 132 which supports glass plate 117 on its flat surface, end cutter 107 and press unit 198 which are provided above belt conveyer 132 and which move in an X-Y orthogonal coordinate system or polar coordinate system. A template 133 cut along a cutting line formed on glass plate 117 is provided between the inner side of the belt of belt conveyer 132 and belt support plate 134 to form a step. In the present breaking unit, glass plate 117 is put through the belt of belt conveyer 132 such that the contour of the cutting line aligns with the contour of template 133. The glass aligns with the contour of template 133. The glass plate is then end cut by end cutter 107 and broken by pushing the glass plate along the contour of template 133 at the step using the press force of press unit 108.

Another specified example of the breaking unit of glass plate working machine according to the present invention will be described.

Figure 22:
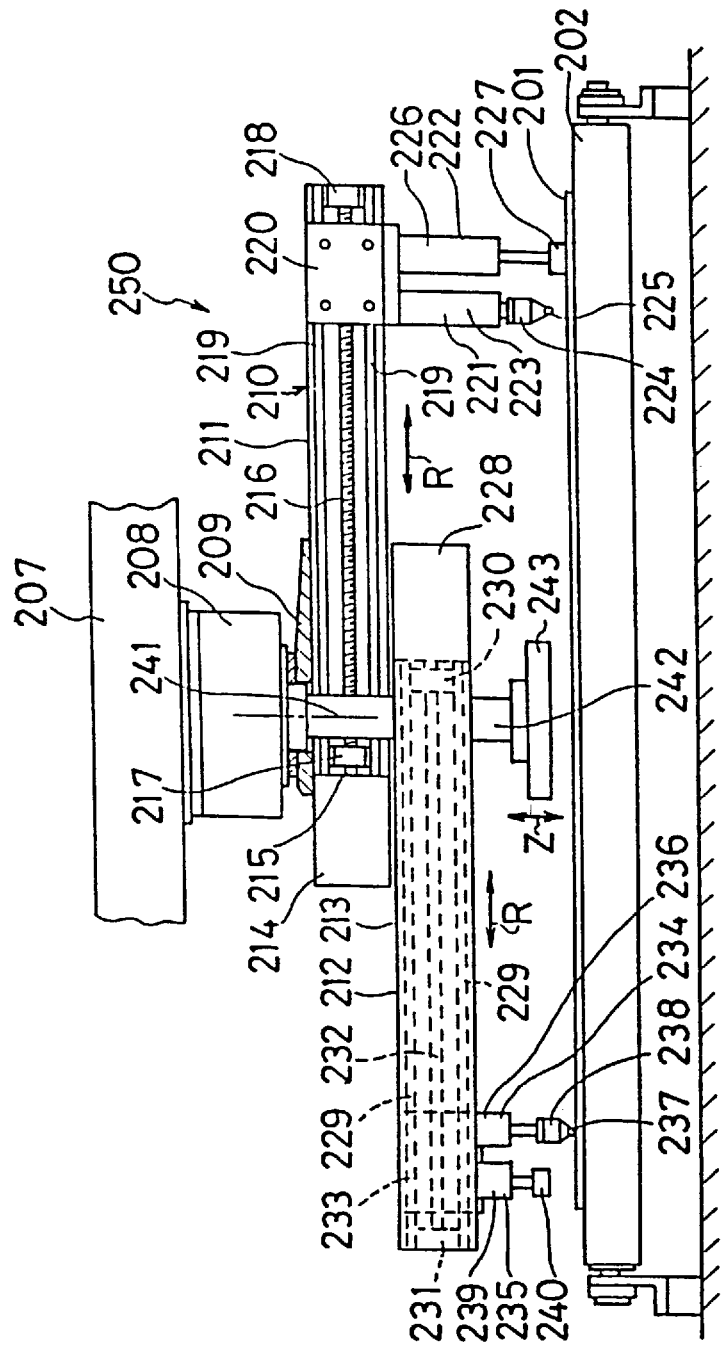
FIG. 22 is a front view of another embodiment of the breaking unit of the glass plate working machine according to the present invention.
Figure 23:
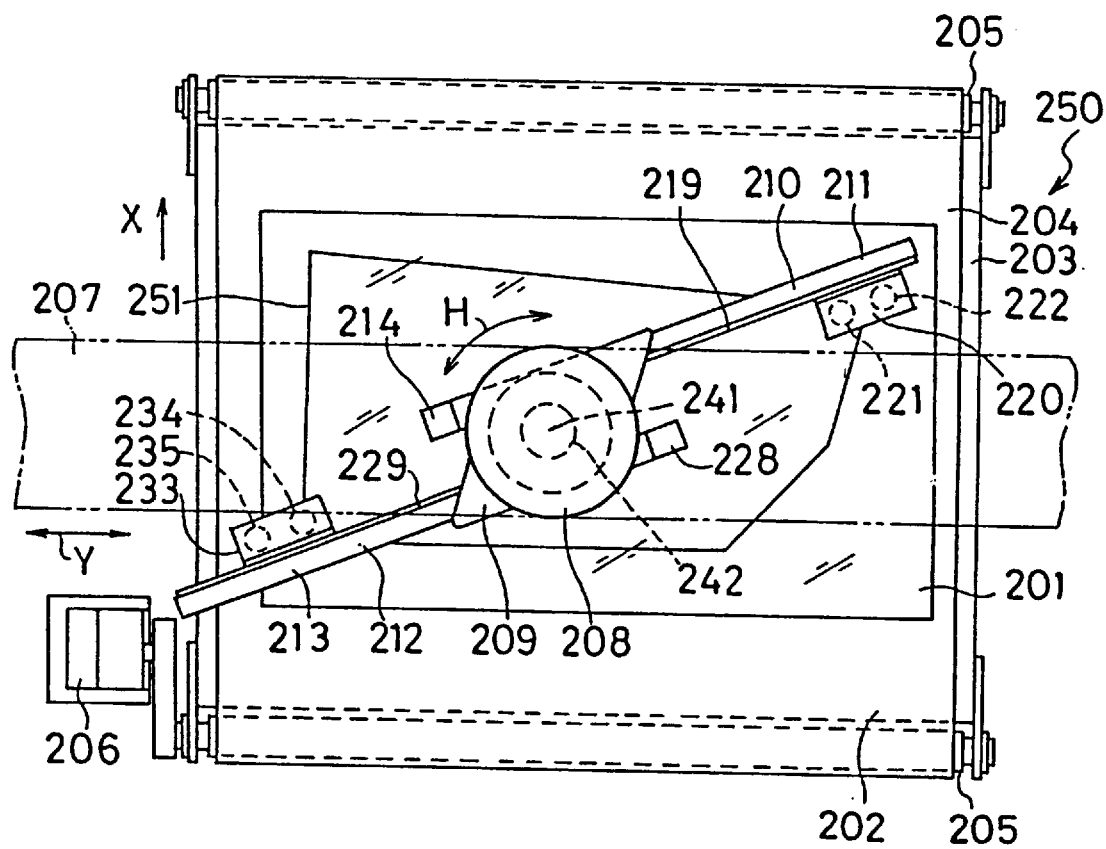
FIG. 23 is a plan view of the illustrative embodiment of FIG. 22.

In FIG. 22 and 23, table 202 on which glass plate 201 to be broken is placed is normally constituted by a belt conveyer to discharge the cullet. Therefore, table 202 includes base 203, belt 204, roller 205 around which belt 204 extends, and a servo motor 206, the rotational output shaft of which is connected through a pulley or the like to roller 205. When rollers 205 are rotated by the rotation of the rotational output shaft of motor 206, an upper portion of belt 204 is moved, for example, in the X direction. A turning unit 208 including a servo motor is attached to a support frame 207 provided above table 202. Support arm 211 of first moving unit 210 and support arm 213 of second moving unit 212 are connected through connection member 209 to the output rotational shaft of turning unit 208. First and second moving units 210 and 212 have substantially the same structure.

In moving unit 210, servo motor 214 is attached to one end of support arm 211 and has output shaft 215 which is connected to one end of screw shaft 216, which is supported rotatably at each end thereof by a respective one of bearings 217 and 218 fixed to support arm 211. Slide 220 is slidably fitted to a pair of rails 219 fixed to support arm 211 in the direction in which support arm 211 extends or in the R direction along the surface of glass plate 211. Screw shaft 216 is screwed into slide 220 so that when output shaft 215 of motor 214 is rotated and hence screw shaft 216 is rotated, slide 220 is moved linearly in the R direction.

End cutter 221 and press unit 222 which constitute the first breaking mechanism are attached to slide 220. End cutter 221 includes air cylinder 223 attached at one end to slide 220 and cutter wheel block 224 attached to an end of the piston rod of air cylinder 223, cutter wheel 225 being provided on cutter wheel block 224. End cutter 221 moves cutter wheel block 224 and hence cutter wheel 225 toward and away from glass plate 201 or in the Z direction by the actuation of air cylinder 223. Press unit 222 similarly includes air cylinder 226 and push member 227 attached to an end of the piston rod of air cylinder 226. Press unit 222 moves push member 227 toward and away form glass plate 201 or in the Z direction by the actuation of air cylinder 226.

In the moving unit 212 which is constructed like moving unit 210, servo motor 228, a pair of rails 229 and bearings 230, 231 are attached to support arm 213. Screw shaft 232 which is supported rotatably by bearings 230 and 231 is connected to the output rotational shaft of motor 228. Slide 233 is fitted to rail 229 slidably in the R direction. Screw shaft 232 is screwed into slide 233 whereby when the rotational output shaft of motor 228 is rotated, slide 233 is linearly moved in the R direction.

End cutter 234 and press unit 235 similar to end cutter 221 and press unit 222 and constituting a second breaking unit are attached to slide 233. Therefore, cutter wheel block 238 including cutter wheel 237 is attached to the piston rod of air cylinder 236 of end cutter 234. Push member 240 is attached to the piston rod of air cylinder 239 of press unit 235.

When the rotational output shaft of turning unit 208 is rotated in the H direction around the center line 241 normal to a surface of the glass plate 201, support arms 211 and 213 of moving units 210 and 212 are also turned around the center line 241 in the H direction through connection member 209.

Hollow member 242 is fixed at one end thereof to support frame 207 so as to extend through the center of turning unit 208. Sucker unit 243 which moves toward and away from glass plate 201 or in the Z direction is attached to a lower end of hollow member 242. After a portion of glass plate 201 outside breaking line 251 of glass plate 201 is broken away, sucker unit 243 lowers to vacuum draw up glass plate 201 to be formed as an article to separate same from the resulting cullet so as to expedite the discharge of the cullet by belt 204.

Motor 206, turning unit 208, motors 214, 228 and sucker unit 243 are connected to a controller (not shown), for example, a numerical control unit comprising a computer, etc. and performs their respective operations under control of the controller, as described below.

Breaking unshaped glass plate 201 along its breaking line 251 by the breaking unit 250 of the present invention, thus constructed, will be described below.

First, an unshaped rectangular glass plate 201 is placed on belt 204. This apparatus may use an attendant or sucker unit 243. If sucker unit 243 is used, turning unit 208 and hollow member 242 are supported movably in the Y direction, for example, on support frame 207, wherein turning unit 208 and hollow member 242 are moved to glass plate table (not shown) by the Y direction moving unit (not shown), and glass plate 201 is sucked up from the glass plate table by sucker unit 243 and turning unit 208 and hollow member 242 are moved to above belt 204 by the Y direction moving unit. Sucker unit 243 is then lowered to release the sucking operation of sucker unit 243 on glass plate 201 to thereby place glass plate 201 on belt 204. Such control over the movement of turning unit 208 and hollow member 242 in the Y direction and suction, lifting and lowering of glass plate 201 by sucker unit 243, etc., may be performed by the above-mentioned controller.

After glass plate 201 is placed on belt 204, turning unit 208 and motors 214 and 228 are actuated by the controller to thereby turn support arms 211 and 213 around center axis 241 in the H direction and move slides 220 and 233 in the R direction. As a result, ends of cutter wheels 225 and 237 are sequentially positioned along expected breaking line 251. In the successive positioning operations of cutter wheels 225 and 237, air cylinders 223 and 236 are actuated at required positions to lower cutter wheels blocks 224 and 238, such that ends of cutter wheels 225 and 237 are applied to glass plate 201 to thereby form a cutting line on breaking line 251 on glass plate 201.

The formation of the cutting line along breaking line 251 at required positions continues until support arms 211 and 213 rotate through half of the complete rotation on glass plate 201 or until support arms 211 and 213 are turned from their respective start points through 180 degrees in the H direction.

The same number of cutting lines is not required to be formed simultaneously along breaking lines 251 at required positions by cutter wheels 225 and 237, but different numbers of cutting lines may instead be formed at different times in conformity to the forms of breaking lines 251.

The turning of support arms 211 and 213 in the H direction and the movement of slides 220 and 233 in the R direction are not required to be at respective constant speeds. For example, they may be at low speed during the formation of a cutting line and may be at higher speed otherwise. They may be performed at various speeds in correspondence to the form of breaking line 251. For example, if quantities of movement of slides 220 and 233 in the R direction per unit turning angle of support arms 211 and 213 in the H direction during the formation of breaking lines are large, the turning speed of support arms 211 and 213 in the H direction may be reduced while, conversely, if quantities of movement of slides 220 and 233 per unit turning angle of support arms 211 and 213 in the H direction during the formation of cutting lines are small, the turning speeds of support arms 211 and 213 in the H direction are increased such that the moving speeds of cutter wheels 225 and 237 relative to glass plate 201 during the formation of cutting lines may be substantially equal at different required positions.

If support arms 211 and 213 are turned in the H direction through 180 degrees from the start points, their turning and the movement of slides 220 and 233 in the R direction are temporarily stopped by the controller. Sucker unit 243 is moved in the Z direction and lowered to suck glass plate 201. Then sucker unit 243 rises to slightly lift glass plate 201. Under the condition where glass plate 201 is slightly lifted, the controller now controls turning unit 208 and motors 214 and 228 such that support arms 211 and 213 are now turned reversely, that slides 220 and 233 are moved in the R direction, and that push members 227 and 237 are located outside the breaking line 251. During successive positioning of push members 227 and 240 in the reverse turning of support arms 211 and 213 in the H direction, air cylinders 226 and 239 are actuated at required positions to lower push members 227 and 240 so as to abut on that portion of glass plate 201 outside the breaking line 251 on glass plate 201, and to break off that portion of glass plate 201, on which the cutting line is formed, at its breaking line 251. Breakage along expected breaking line 251 at required positions is made until support arms 211 and 213 each are reversely half turned on the surface of glass plate 201, in other words, until support arms 211 and 213 are reversely turned through 180 degrees from the points where their first turning operations end in the H direction or to the positions where their first turning operations start.

The breakage by push members 227 and 240 at required positions is not required to be made simultaneously by the same quantity, but may be made at different points of time so as to be different in number in correspondence with the forms of breaking lines 251 as in the formation of the cutting lines for breaking lines 251 at required positions by cutter wheels 225 and 237. While the turning of support arms 211 and 213 in the H direction and the movement of slides 220 and 223 in the R direction should preferably be stopped when push members 227 and 240 abut on glass plate 201, they are not required to stop if push members 227 and 240 are arranged so as to be rotatable.

When support arms 211 and 213 are brought to the positions where their first turning operations start, further turning of support arms 211 and 213 in the H direction and further movement of slides 220 and 223 in the R direction are stopped by the controller at which time glass plate 201 formed as an article by breakage at breaking line 251 and the resulting cullets are obtained and the cullets are discharged by the movement of the upper portion of the belt 204 in the X direction.

The glass plate 201 as the article lifted by sucker unit 243 Is conveyed to the next working position by the movement of turning unit 208 in the Y direction for being subjected to the next working.

As just described above, the breaking operation is completed by half of the complete turning of support arms 211 and 213 in the breaking unit 250 for glass plate 201 according to the present invention.

The present invention is not limited to the specified embodiment of FIG. 22. For example, while the embodiment of FIG. 22 shows support arms 211 and 213 with a step, support arms 211 and 213 may be provided instead at the same level.

Slides 220 and 233 may be arranged such that they each have a servo motor mounted thereon so as to be moved in the R direction.

While the embodiment shown in FIG. 22 is illustrated as including the pair of breaking mechanisms which in turn includes moving units 211, 212, end cutters 221, 234 and press units 222, 235, the moving units 221 and 222 mechanisms being connected to turning unit 208 such that the respective breaking mechanisms are capable of being positioned at positions angularly spaced equally by 180 degrees in the direction of turning of moving units 211 and 212 by turning unit 208 or in the H direction, three or more moving units and breaking mechanisms may be provided, the respective moving units being connected to turning unit 208 such that the respective breaking mechanisms are capable of being positioned at equally angularly spaced positions in the direction of turning of the moving units by turning unit 208.

While the glass plate working machine according to the present invention is suitable for forming the window glass of cars, it is not necessarily limited to it in use.

As described above, the glass plate working machine according to the present invention includes moving units for linearly moving the respective breaking mechanisms along the surface of a glass plate placed on the table, the turning unit for turning the moving units around the center line normal to the glass plate, and the controller which controls the breaking operation of the breaking units, the movements of the moving units, and the turning operation of the turning unit, so that even if the shapes of glass plates to be formed by breakage vary from one to another, semi-permanent reinstallation of the breaking mechanisms is not required for each of possible different shapes of the glass plates, but previous preparation of control programs can directly adjust to such variations of the shapes of glass plates to thereby simplify the breaking operation, to reduce the working time and to adjust to flexible manufacturing.

In a case where the respective moving units are connected to the turning unit such that the respective breaking mechanisms are positionable at equally angularly spaced positions in the direction of turning of the moving units by the turning unit, breakage of the overall periphery of a glass plate can be shared equally by a plurality of breaking mechanisms to thereby greatly reduce the breaking time.

As described above, a pair of end cutter and press unit is used to perform end cutting on a journey in one direction and to perform pressing and braking on the return journey while being moved and positioned in a polar coordinate system, so that the arrangement is simple and efficiently performs complete automatic breakage on the data stored previously. If the shape of a glass plate to be broken changes, the program is only required to be changed. In end cutting, the cutter wheel is lowered at required positions through the air cylinder so as to abut on the glass plate, and the linear slide unit is operated for linear movement. Therefore a desired cut end length is obtained.

I claim:

1. A method of producing a glass plate having a predetermined shape, said method comprising the steps of:
    forming a main cutting line and an end cutting line on an unshaped glass plate to produce a cut glass plate;
    providing an automatically movable pressing means for breaking said cut glass plate, said automatically moveable pressing means being moveable relative to said cut glass plate in a plane coordinate system;
    automatically moving said pressing means and breaking said cut glass plate with said pressing means along a cutting line to form a broken glass plate while forming the main cutting line; and
    grinding an edge of said broken glass plate.

* * * * *

UNITED STATES PATENT AND TRADEMARK OFFICE

CERTIFICATE OF CORRECTION

PATENT NO.     : 5,810,642
DATED          : September 22, 1998
INVENTOR(S)    : BANDO It is certified that error appears in the above-identified patent and that said letters patent is hereby corrected as shown below:

On the title page, under "References Cited - U.S. Patent Documents", column 2, line 1, delete "4,651,180 - 3/1987 - Kitaya et al. ."

Signed and Sealed this

Sixteenth Day of February, 1999

Attest:

Attesting Officer

*Acting Commissioner of Patents and Trademarks*